(12) United States Patent
Isono et al.

(10) Patent No.: US 8,617,693 B2
(45) Date of Patent: Dec. 31, 2013

(54) ANTIREFLECTION LAMINATE

(75) Inventors: Saki Isono, Tokyo-to (JP); Toshio Yoshihara, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 264 days.

(21) Appl. No.: 12/696,481

(22) Filed: Jan. 29, 2010

(65) Prior Publication Data

US 2010/0189971 A1   Jul. 29, 2010

Related U.S. Application Data

(63) Continuation-in-part of application No. 12/671,261, filed as application No. PCT/JP2008/056163 on Mar. 28, 2008.

(30) Foreign Application Priority Data

Aug. 1, 2007   (JP) ................... 2007-201380

(51) Int. Cl.
  *B32B 7/02*   (2006.01)
  *G02B 1/00*   (2006.01)
  *C08K 3/36*   (2006.01)
  *C08G 77/04*  (2006.01)

(52) U.S. Cl.
  USPC ........ 428/212; 428/331; 428/336; 428/313.9; 428/405

(58) Field of Classification Search
  None
  See application file for complete search history.

(56) References Cited

U.S. PATENT DOCUMENTS

| | | | |
|---|---|---|---|
| 2006/0057307 A1* | 3/2006 | Matsunaga et al. | 428/1.31 |
| 2007/0036965 A1* | 2/2007 | Fukushige et al. | 428/313.9 |
| 2007/0048457 A1* | 3/2007 | Ando et al. | 428/1.1 |
| 2007/0146887 A1 | 6/2007 | Ikeda et al. | |

FOREIGN PATENT DOCUMENTS

| | | |
|---|---|---|
| JP | 2003-262703 A | 9/2003 |
| JP | 2003-266606 A | 9/2003 |
| JP | 2005-099778 A | 4/2005 |
| JP | 2005-227472 A | 8/2005 |
| JP | 2006-257402 A | 9/2006 |
| JP | 2006-291077 A | 10/2006 |
| JP | 2007-078711 A | 3/2007 |
| JP | 2007-083228 A | 4/2007 |
| WO | WO2004017105 * | 2/2004 |

OTHER PUBLICATIONS

"A Guide to Silane Solutions from Dow Corning". Dow Corning, (2005); pp. 3-31.*
International Search Report: PCT/JP2008/056163.

* cited by examiner

*Primary Examiner* — Prashant J Khatri
(74) *Attorney, Agent, or Firm* — Ladas & Parry LLP

(57) ABSTRACT

An antireflection laminate for use mainly in displays such as LCDs and PDPs, which has a refractive index layer that has, while comprising hollow and solid particles, excellent abrasion resistance, a refractive index of 1.45 or less, and low reflectivity is disclosed. The refractive index layer is obtained by irradiating a refractive index layer forming composition with ionizing radiation, the composition including an ionizing radiation curable resin, a crosslinkable hollow particle having an inside that is porous or hollow and is covered with an outer shell layer and having a surface that is modified with a crosslinkable group(s), and a crosslinkable solid particle having an inside that is neither porous nor hollow and having a surface that is modified with a crosslinkable group(s). The crosslinkable groups comprise an ionizing radiation curable group each and have an identical structure or a very similar structure.

10 Claims, 5 Drawing Sheets

ANTIREFLECTION LAMINATE

TECHNICAL FIELD

The present invention relates to an antireflection laminate disposed on the front surface of displays (image display devices) such as LCDs.

BACKGROUND ART

Display surfaces in image display devices such as liquid crystal displays (LCDs), cathode ray tube display devices (CRTs) and plasma display panels (PDPs) are required to reduce the reflection of light emitted from external light sources such as fluorescent lamps to enhance image visibility. Accordingly, based on the phenomenon in which there is a decrease in reflectivity by covering the surface of a transparent object with a transparent film having a low refractive index (low refractive index layer), it has been attempted to increase the image visibility of display surfaces in image display devices by providing an antireflection film thereon to reduce the reflectivity.

There are various methods for obtaining a low refractive index. One of them is a method for decreasing the refractive index of a layer by allowing air having a refractive index of 1 to be contained inside the layer.

As such an air-containing refractive index layer, for example, patent literature 1 disclosed an antireflection film which has a low refractive index layer that comprises an ionizing radiation curable resin composition and a silica fine particle comprising an outer shell layer and an inside that is porous or hollow, wherein at least part of the particle surface is treated with silane coupling agents each comprising an ionizing radiation curable group, with the purpose of providing an antireflection film having a low refractive index and excellent mechanical strength.

With the purpose of increasing the antireflection performance of a low refractive index layer, patent literature 2 disclosed a technique of using a cured film formed from a composition that comprises porous fine particles and a compound having at least two (meth)acryloyloxy groups in a molecule thereof or an oligomer of the compound.

The porous fine particles are inorganic particles, however, so that their affinity with organic binder components is poor if no surface treatment is performed thereon with silane coupling agents or the like. Accordingly, the porous fine particles are likely to be aggregated and unevenly present in the layer formed by curing the composition. As a result, the cured layer is a layer in which the refractive index of the layer surface varies from part to part, or is a layer which has transparent parts and opaque parts together. An antireflection film having such a non-uniform layer structure has a problem of poor abrasion resistance properties such as poor steel wool resistance.

In the hope of increasing the hardness of a refractive index layer and providing the refractive index layer with functions such as an antistatic function, patent literature 3 disclosed a technique of using, as the refractive index layer, a cured layer formed from a composition that comprises porous fine particles, non-porous inorganic compound fine particles, and a binder component selected from curable compounds and resins.

The strength of solid particles is higher than that of hollow particles because the inside of solid particles is neither porous nor hollow, and is densely filled. Accordingly, by incorporating solid particles in the refractive index layer, it is expected to increase the strength of the refractive index layer with respect to pressure in the layer thickness direction (direction perpendicular to the plane of the layer.)

Patent literature 1: Japanese Patent Application Laid-Open (JP-A) No. 2005-99778
Patent literature 2: JP-A No. 2003-262703
Patent literature 3: JP-A No. 2003-266606

SUMMARY OF INVENTION

Technical Problem

In a study done by the inventors of the present invention, however, it was found that contrary to the above expectation, the hardness of the refractive index layer can be decreased by the method disclosed in patent literature 3. More specifically, it was found that when non-porous inorganic compound particles (solid particles) are incorporated in the refractive index layer for increasing its hardness, the abrasion resistance of the refractive index layer is deteriorated, thereby decreasing the surface hardness of the layer.

The refractive index of solid particles is higher than that of hollow particles because the inside of solid particles is densely filled and contains no air. Accordingly, the refractive index of the layer is increased by adding a large amount of solid particles to the layer for the purpose of increasing the layer strength, resulting in a problem that the antireflection performance of an antireflection film comprising the layer is decreased.

The present invention was achieved to solve the above problems, ant it is to provide an antireflection laminate which has a refractive index layer that has, while comprising hollow and solid particles, excellent abrasion resistance, a refractive index of 1.45 or less, and low reflectivity.

Solution to Problem

The antireflection laminate of the present invention is an antireflection laminate which comprises a refractive index layer that has a refractive index of 1.45 or less, wherein the refractive index layer is a cured product obtained by irradiating a refractive index layer forming composition with ionizing radiation;

wherein the refractive index layer forming composition comprises:

an ionizing radiation curable resin, a crosslinkable hollow particle having an inside that is porous or hollow and is covered with an outer shell layer, and a surface that is modified with a crosslinkable group(s), and a crosslinkable solid particle having an inside that is neither porous nor hollow, and a surface that is modified with a crosslinkable group(s); and wherein the crosslinkable group(s) on the surface of the hollow particle and the crosslinkable group(s) on the surface of the solid particle are crosslinkable groups which comprise a binding group that can be bound to the particle surface, a spacer moiety and an ionizing radiation curable group each, and have an identical structure or, even if they are different in structure, a similar structure in which the ionizing radiation curable groups are common in framework and only different in the presence of one hydrocarbon group having one to three carbon atoms; the binding groups are common in framework and only different in the presence of one hydrocarbon group having one to three carbon atoms; and the spacer moieties are common in framework and only different in the presence of one hydrocarbon group having one to three carbon atoms or one functional group having one to three constituent atoms including a heteroatom but not hydrogen, or in the presence of one to two carbon atoms in a carbon chain of the framework.

The hollow particle contains air inside the particle, and the refractive index of air is 1, so that the refractive index of the hollow particle is lower than that of the ionizing radiation curable resin or solid particle in the refractive index layer. Accordingly, the refractive index layer which contains the hollow particle can be provided with a low refractive index, thereby decreasing the reflectivity of the antireflection laminate of the present invention, and thus increasing the image visibility.

The solid particle has no void inside the particle. Compared to the hollow particle, therefore, it is more resistant to crushing by pressure from outside (external pressure) and is thus excellent in pressure resistance. Because of this, it is easy to increase the abrasion resistance of the refractive index layer which comprises the solid particle. In the present invention, "void" means an air-containing hollow(s) or a hole(s) contained in a porous structure.

Furthermore, the hollow particle and solid particle of the present invention are each surface-modified with a crosslinkable group(s), and the crosslinkable groups have an identical structure or a large number of common moieties in their primary structures. The crosslinkable groups have crosslinking reactivity, so that they can create a crosslinking bond between the hollow particle, the solid particle and the ionizing radiation curable resin. Because of the crosslinking bond, compared to conventional antireflection layers, the linkage between the resin and the particles is more rigid. In addition, because the crosslinkable groups have a quite large number of common moieties, the affinity between the hollow particle and the solid particle is higher than before; therefore, the hollow particles and the solid particles are less likely to aggregate each, and the hollow particles and the solid particles are uniformly and densely filled in the refractive index layer. Because of this, the refractive index layer of the present invention is provided with a smooth surface, and abrasion resistance of the surface of the layer can be increased against scratching (steel wool resistance).

In the antireflection laminate of the present invention, the hollow particle and the solid particle are each preferably an inorganic particle. An inorganic particle has high hardness, so that when mixed with the ionizing radiation curable resin to form a refractive index layer, the abrasion resistance of the layer can be increased.

In the antireflection laminate of the present invention, the hollow particle and the solid particle are each preferably at least one selected from the group consisting of a metal oxide, a metal nitride, a metal sulfide and a metal halide, so that particles with high strength and excellent pressure resistance can be stably obtained.

In the antireflection laminate of the present invention, due to excellent productivity, it is preferable that surface modification of the hollow particle and the solid particle with the crosslinkable group(s) is performed by using coupling agents which comprise a binding group that can be bound to the particle surface, a spacer moiety and an ionizing radiation curable group each, and which have an identical structure or, even if they are different in structure, a similar structure in which the ionizing radiation curable groups are common in framework and only different in the presence of one hydrocarbon group having one to three carbon atoms; the binding groups are common in framework; groups that are other than the spacer moieties and are bound to the binding groups are only different in the presence of one hydrocarbon group having one to three carbon atoms; and the spacer moieties are common in framework and only different in the presence of one hydrocarbon group having one to three carbon atoms or one functional group having one to three constituent atoms including a heteroatom but not hydrogen, or in the presence of one to two carbon atoms in a carbon chain of the framework.

In the antireflection laminate of the present invention, preferably, the hollow particles of 100 parts by weight are modified by using the coupling agents of 1 part by weight or more and 200 parts by weight or less, and the solid particles of 100 parts by weight are modified by using the coupling agents of 1 part by weight or more and 200 parts by weight or less. By setting the used amount of the coupling agents to 1 part by weight or more, there is an increase in the affinity of the hollow and solid particles for the ionizing radiation curable resin which mainly comprises an organic component, so that the hollow particles and the solid particles are uniformly and stably dispersed in a coating liquid or in the refractive index layer. By setting the used amount of the coupling agents to 50 parts by weight or less, it is possible to excellently prevent the coupling agents from being left unused in the treatment of the hollow and solid particles and thus to prevent free the coupling agents from being produced; therefore, the refractive index layer can be provided with flexibility.

In an embodiment of the antireflection laminate of the present invention, the average particle diameter A of the solid particles preferably has the following relationship with the average particle diameter B of the hollow particles:

$10 \text{ nm} \leq A \leq 40 \text{ nm};$ $30 \text{ nm} \leq B \leq 60 \text{ nm};$ and $A \leq B$ Also in the laminate, the refractive index layer preferably contains the solid particles of 5 to 50 parts by weight with respect to the hollow particles of 100 parts by weight. Because of this, the solid particles enter and densely fill the space between the hollow particles in the refractive index layer, so that it is particularly highly effective in increasing the abrasion resistance, especially steel wool resistance, of the layer surface.

In the present invention, average particle diameter means the 50% particle diameter (d50 median diameter) of particles, which is obtained by measuring particles in a solution by dynamic light scattering and expressing the thus-obtained particle size distribution by a cumulative distribution. The average particle diameter may be measured by means of Microtrac particle size analyzer manufactured by Nikkiso Co., Ltd. Also in the present invention, average particle diameter of particles in a layer is measured by means of a transmission electron microscope (TEM). More specifically, particles are observed by the microscope at a magnification of 500,000× to 2,000,000×, and the average of particle diameters of 100 of the observed particles is referred to as the average particle diameter.

In other embodiment of the antireflection laminate of the present invention, the average particle diameter A of the solid particles preferably has the following relationship with the average particle diameter B of the hollow particles:

$30 \text{ nm} \leq A \leq 100 \text{ nm};$ $30 \text{ nm} \leq B \leq 60 \text{ nm};$ and $A > B$ Also in the laminate, the refractive index layer preferably contains the solid particles of 5 to 50 parts by weight with respect to the hollow particles of 100 parts by weight. Because of this, in the refractive index layer, the number of the solid particles having a large volume is increased, and space is thus formed between the solid particles and the hollow particles in film production, in which space air is present, so that it is particularly effective in decreasing the reflectivity of the refractive index layer.

In the antireflection laminate of the present invention, at least part of the ionizing radiation curable resin preferably comprises a compound having at least one or more hydrogen bond forming groups and three or more ionizing radiation curable groups in a molecule thereof. When the ionizing radiation curable resin has a hydrogen bond forming group(s) as mentioned above, a polymerization reaction, crosslinking reaction or the like is induced between the same or different kinds of functional groups by heating, so that the resin is cured to form a coating film. When the ionizing radiation curable resin has ionizing radiation curable groups as mentioned above, a polymerization reaction, crosslinking reaction or the like is induced between the curable groups by irradiation with ionizing radiation, so that the resin is cured to form a coating film.

In the antireflection laminate of the present invention, the ionizing radiation curable groups are preferably an acryloyl group(s) and/or a methacryloyl group(s). Acryloyl groups and methacryloyl groups have excellent productivity and make it easy to control the mechanical strength of the refractive index layer being cured.

In the antireflection laminate of the present invention, preferably, the ionizing radiation curable resin, the hollow particle and the solid particle are covalently bound to each other via the ionizing radiation curable groups, so that the abrasion resistance of the refractive index layer can be increased.

In the antireflection laminate of the present invention, the thickness of the refractive index layer is preferably 0.05 µm or more and 0.15 µm or less, so that the refractive index layer can be provided with a sufficient antireflection effect.

In the antireflection laminate of the present invention, the refractive index of the solid particle is preferably smaller than the refractive index of the ionizing radiation curable resin. The refractive index of the refractive index layer can be decreased by making the refractive index of the solid particle smaller than that of the ionizing radiation curable resin.

In the antireflection laminate of the present invention, the refractive index layer is preferably provided on one surface of an optically transparent substrate directly or via other layer as a low refractive index layer that is smallest in refractive index.

In the antireflection laminate of the present invention, the other layer is preferably a hard coat layer.

Advantageous Effects of Invention

In the antireflection laminate of the present invention, the hollow particles and the solid particles are uniformly and densely filled in the refractive index layer, so that the strength of the layer is increased, thereby providing the layer with excellent abrasion resistance.

DESCRIPTION OF EMBODIMENTS

The antireflection laminate of the present invention is an antireflection laminate which comprises a refractive index layer that has a refractive index of 1.45 or less, wherein the refractive index layer is a cured product obtained by irradiating a refractive index layer forming composition with ionizing radiation;

wherein the refractive index layer forming composition comprises:

an ionizing radiation curable resin, a crosslinkable hollow particle having an inside that is porous or hollow and is covered with an outer shell layer, and a surface that is modified with a crosslinkable group(s), and a crosslinkable solid particle having an inside that is neither porous nor hollow, and a surface that is modified with a crosslinkable group(s); and wherein the crosslinkable group(s) on the surface of the hollow particle and the crosslinkable group(s) on the surface of the solid particle are crosslinkable groups which comprise a binding group that can be bound to the particle surface, a spacer moiety and an ionizing radiation curable group each, and have an identical structure or, even if they are different in structure, a similar structure in which the ionizing radiation curable groups are common in framework and only different in the presence of one hydrocarbon group having one to three carbon atoms; the binding groups are common in framework and only different in the presence of one hydrocarbon group having one to three carbon atoms; and the spacer moieties are common in framework and only different in the presence of one hydrocarbon group having one to three carbon atoms or one functional group having one to three constituent atoms including a heteroatom but not hydrogen, or in the presence of one to two carbon atoms in a carbon chain of the framework.

The hollow particle contains air having a refractive index of 1 inside the particle, so that the refractive index of the hollow particle is lower than that of the ionizing radiation curable resin or solid particle in the refractive index layer. Accordingly, the refractive index layer which contains the hollow particle can be provided with a low refractive index, thereby decreasing the reflectivity of the antireflection laminate of the present invention, and thus increasing the image visibility. No particular limitation is imposed on refractive index measurement, and conventional methods may be used therefor. For example, there may be mentioned a method for measuring the refractive index with a reflectance curve measured by a spectrophotometer and by using a simulation, and a method for measuring the refractive index with an ellipsometer.

The solid particle has no void inside the particle. Compared to the hollow particle, therefore, it is more resistant to crushing by pressure from outside (external pressure) and thus is excellent in pressure resistance. Because of this, it is easy to increase the abrasion resistance of the refractive index layer which comprises the solid particle.

Furthermore, the hollow particle and solid particle of the present invention are each surface-modified with a crosslinkable group(s), and the crosslinkable groups have an identical structure or a large number of common moieties in their primary structures. The crosslinkable groups have crosslinking reactivity, so that they can create a crosslinking bond between the hollow particle, the solid particle and the ionizing radiation curable resin. Because of the crosslinking bond, compared to conventional antireflection layers, the linkage between the resin and the particles is more rigid.

In addition, because the crosslinkable groups have a quite large number of common moieties, the affinity between the hollow particle and the solid particle is higher than before; therefore, the hollow particles and the solid particles are less likely to aggregate each, and the hollow particles and the solid particles are uniformly and densely filled in the refractive index layer. Because of this, the refractive index layer of the present invention is provided with a smooth surface, and abrasion resistance of the surface of the layer can be increased against scratching (steel wool resistance).

Hereinafter, the refractive index layer forming composition which is a component for forming the refractive index layer of the present invention, and the antireflection laminate formed by using the same will be described in order.

<1. Refractive Index Layer Forming Composition>

The refractive index layer forming composition of the present invention comprises, as essential components, a crosslinkable hollow particle having a surface that is modified with a crosslinkable group(s), a crosslinkable solid particle having a surface that is modified with a crosslinkable group(s), and an ionizing radiation curable resin. Hereinafter, the hollow particle, the solid particle and the ionizing radiation curable resin, which are the essential components of the refractive index layer forming composition, and other components that can be used as needed, will be described.

<1-1-1. Hollow Particle>

The hollow particle of the present invention is a particle which comprises an outer shell layer and an inside that is covered with the outer shell layer, which inside has a porous structure or hollow. Air is contained in the porous structure or hollow, which has a refractive index of 1. By incorporating the hollow particle in the refractive index layer, the refractive index of the layer can be decreased.

Inorganic or organic materials may be used as the material for the hollow particle of the present invention. In view of productivity, strength, etc., inorganic materials are preferred. In this case, the outer shell layer is formed with an inorganic material.

In the case of forming the hollow particle with an inorganic material, the material for the hollow particle is preferably at least one selected from the group consisting of a metal oxide, a metal nitride, a metal sulfide and a metal halide. By forming the hollow particle with the above material, it is possible to obtain a particle which has an outer shell that is high in strength and is thus resistant to crushing by external pressure. It is more preferable to form the hollow particle with a metal oxide or a metal halide, and it is particularly preferable to form the material with a metal oxide or a metal fluoride. By using these materials, a hollow particle which is higher in strength and lower in refractive index can be obtained.

Metal elements that can be used as the metal oxides, etc., are preferably Na, K, Mg, Ca, Ba, Al, Si and B, and more preferably Mg, Ca, Al and Si. By using such metal elements, it is possible to obtain a hollow particle which has a low refractive index and is easier to produce than the case of using elements other than the above, can be obtained. These metal elements can be used solely or in combination of two or more kinds.

As a specific example of organic fine particles having a void, there may be preferably mentioned a hollow polymer fine particle prepared by using the technique disclosed in Japanese Patent Application Laid-Open 2002-80503.

In the present invention, to form the hollow particle with a metal oxide, in view of the refractive index or productivity of the material, it is particularly preferable to use a hollow particle of silica (silicon dioxide: $SiO_2$). A hollow silica particle has a minute void inside the particle, and air having a refractive index of 1 is contained inside the particle. Accordingly, the refractive index of the particle is smaller than the refractive index of the solid particle and that of the ionizing radiation curable resin, thereby decreasing the refractive index of the refractive index layer that contains the hollow particle. That is, compared to a silica particle having no air inside (refractive index n=about 1.46), a hollow silica particle having a void inside has a lower refractive index of 1.20 to 1.45, so that it can provide the refractive index layer with a refractive index of 1.45 or less.

<1-1-2. Method for Producing Hollow Particle>

The type of the hollow silica particle is not particularly limited and is only required to have a refractive index of 1.44 or less. As such a hollow silica particle, there may be mentioned a multiple oxide sol or hollow silica particle disclosed in Japanese Patent Application Laid-Open (JP-A) No. H7-133105, JP-A No. 2001-233611, etc. In particular, such a hollow silica particle can be produced by the following first to third steps, followed by the following fourth step as needed.

More specifically, in the first step, an alkaline aqueous solution comprising a silica material and an alkaline aqueous solution comprising an inorganic oxide material other than silica are preliminarily prepared, or an aqueous solution is prepared by mixing both materials. Next, depending on the multiple ratio of the target multiple oxide, the resulting aqueous solution is gradually added to an alkaline aqueous solution of pH 10 with stirring, thereby obtaining colloid particles comprising a multiple oxide. Instead of the first step, a dispersion liquid containing seed particles can be used as the starting material.

The seed particles used here are particles that can be used for forming a hollow or porous structure in the preparation of hollow particles, and the following seed particles serve as seeds to grow core particles. In the second step, the whole or part of the core particles are removed to form the hollow or porous structure. Use of seed particles makes it easy to control the diameter of the particles grown, thereby obtaining core particles having a uniform particle diameter.

Next, in the second step, at least part of elements other than silicon and oxygen are selectively removed from the colloid particles comprising the multiple oxide obtained in the first step. More specifically, elements in the multiple oxide are removed by being dissolved with a mineral acid or organic acid, or by ion exchange in contact with an ion-exchange resin. Now, the colloid particles of the multiple oxide are such that part of the elements are removed therefrom.

Then, in the third step, a hydrolyzable organic silicon compound, silicic acid solution or the like is added to the colloid particles of the multiple oxide obtained in the above step, from which part of the elements are removed, to cover the surface of the colloid particles with a polymer of the hydrolyzable organic silicon compound, silicic acid solution or the like. Silica fine particles can be obtained in this way, which are the multiple oxide sol disclosed in the patent literature mentioned above.

As the hydrolyzable organic silicon compound, for example, an alkoxysilane represented by the general formula RnSi(OR')4-n (wherein R and R' are each a hydrocarbon group such as an alkyl group, an aryl group, a vinyl group and an acrylic group; and n=0, 1, 2 or 3) can be used. Particularly, tetraalkoxysilanes such as teroramethoxysilane, tetraethoxysilane and tetraisopropoxysilane are preferably used.

The method for adding the hydrolyzable organic silicon compound can be as follows, for example: a solution prepared by adding a small amount of alkali or acid serving as a catalyst to a mixed solution of any of the above-mentioned alkoxysilanes, pure water and alcohol, is added to the colloid particles obtained in the second step so that a silicic acid polymer formed by hydrolysis of the alkoxysilane is deposited on the surface of the colloid particles. The alkoxysilane, alcohol and catalyst may be added at once to the colloid particles. As the alkali catalyst, ammonia, hydroxides of alkali metals, and amines may be used. As the acid catalyst, various kinds of inorganic and organic acids may be used.

In the case where the dispersion medium of the colloid particles is solely water, or the ratio of water to an organic solvent is high in the dispersion medium, coating treatment with a silicic acid solution can be used. The silicic acid solution is a solution of a silicic acid with a low degree of polymerization and is prepared by performing ion-exchange treatment on an aqueous solution of an alkali metal silicate (e.g., liquid glass) for dealkalization. In the case of using a silicic acid solution, a predetermined amount of silicic acid solution is added to the colloid particles, and alkali is added thereto at the same time to polymerize the silicic acid solution for gelation, thereby depositing a silicic acid polymer on the surface of the colloid particles. The covering treatment can be performed by using a silicic acid solution in combination with the above-mentioned alkoxysilane. The added amount of the organic silicon compound or silicic acid solution is an amount which allows the polymer of the compound or solution to cover the surface of the colloid particles sufficiently.

Furthermore, as the fourth step, hydrothermal treatment is preferably performed on the silica particles obtained in the third step in the range from 50 to 300° C. If the hydrothermal treatment temperature is set at 50° C. or more, the amount of the alkali metal oxide and/or ammonia which is contained in the silica particles or dispersion liquid of silica particles that will be finally obtained, is efficiently reduced, thereby increasing the storing stability of a coating liquid or coating strength. If the hydrothermal treatment temperature is set at 300° C. or less, storing stability of a coating liquid or coating strength is increased, thereby preventing aggregation of the silica particles.

On the surface of the silica particles obtained through the first to third steps, various kinds of low-molecular-weight compounds are more likely to be present as ionic impurities. The ionic impurities are derived from those contained in the raw materials for the particles or additives added in the production steps. Accordingly, by performing hydrothermal treatment in the fourth step and thus removing the ionic impurities, it becomes easy to set the amount of impurities on the surface of the silica particles to the predetermined amount or less.

More specifically, the content of the alkali metal oxide in the silica particles is preferably set to 10 ppm or less, more preferably 5 ppm or less, particularly preferably 2 ppm or less. The stability of the coating liquid which contains the silica particles is increased by setting the content of the alkali metal oxide especially to 5 ppm or less. That is, even in the case of storing the coating liquid for a long term, it is possible to prevent an increase in the viscosity of the coating liquid, thereby realizing excellent storing stability. Also, by setting the content of the alkali metal oxide within the above range, a reaction between the surface of the silica particles and a compound for introducing a crosslinkable group(s) onto the surface, such as silane coupling agents, is presumed to be performed more firmly, thereby increasing the strength of the refractive index layer (the silane coupling agents will be described below). By setting the content of the alkali metal oxide to 10 ppm or less, it is possible to increase the film-forming ability of the coating liquid or the strength of a film to be obtained. The content of the alkali metal oxide means the content of $M_2O$ (herein, M denotes an alkali metal element) and can be measured by a common atomic absorption spectrometry or ICP MS spectrometry.

The content of ammonia (including ammonium ion) in the silica particles is preferably 2,000 ppm or less, more preferably 1,500 ppm or less, particularly preferably 1,000 ppm or less. Especially, by setting the ammonia content to 1,500 ppm or less, the stability of the coating liquid which contains the silica particles is increased. That is, even in the case of storing the coating liquid for a long term, it is possible to prevent an increase in the viscosity of the coating liquid, thereby realizing excellent storing stability. Also, by setting the ammonia content within the above range, a reaction between the surface of the silica particles and a compound for introducing a crosslinkable group(s) onto the surface, such as silane coupling agents, is presumed to be performed more firmly, thereby increasing the strength of the refractive index layer. If the ammonia content is set to 2,000 ppm or less, as with the above case, it is possible to increase the film-forming ability of the coating liquid or the strength of a film to be obtained. The content of ammonia (including ammonium ion) means the content of $NH_3$ and can be measured by a common chemical analysis method.

To set the content of the impurity compounds in the silica particles within the above range, the fourth step (hydrothermal treatment process) can be repeated several times. By repeating hydrothermal treatment, the content of the alkali metal oxide and/or ammonia (including ammonium ion) in the thus-obtained silica particles can be decreased.

<1-2-1. Solid Particle>

The solid particle of the present invention is a particle having an inside that is neither porous nor hollow. Because of having no void, compared to the hollow particle, the solid particle is more resistant to crushing by pressure from outside (external pressure) and thus is excellent in pressure resistance. Because of this, it is easy to increase the abrasion resistance of the refractive index layer which comprises the solid particle.

Inorganic or organic materials may be used as the material for the solid particle of the present invention. In view of increasing the strength of the refractive index layer against pressure, inorganic materials are preferred.

In the case of forming the solid particle with an inorganic material, the material for the solid particle is preferably at least one selected from the group consisting of a metal oxide, a metal nitride, a metal sulfide and a metal halide. By forming the solid particle with the above material, it is possible to stably obtain a particle with high strength. It is more preferable to use a metal oxide or metal halide as the material for the solid particle, and it is still more preferable to use a metal oxide or metal fluoride as the material for the solid particle. By using these materials, the solid particle is provided with a lower refractive index and is likely to provide the antireflection layer with excellent performance.

Metal elements that can be used as the metal oxides, etc., are preferably Na, K, Mg, Ca, Ba, Al, Si and B, and more preferably Mg, Ca, Al and Si. By using such metal elements, it is possible to increase the strength of the solid particle and decrease the refractive index of the same. These metal elements can be used solely or in combination of two or more kinds.

In the present invention, to further decrease the refractive index of the refractive index layer, the refractive index of the solid particle is preferably smaller than the refractive index of the ionizing radiation curable resin. The refractive index of silica ($SiO_2$) is 1.42 to 1.46 and thus is lower than the refractive index of acrylic resins that are preferably used as the ionizing radiation curable resin, 1.49 to 1.55. Because of this, silica ($SiO_2$) is preferably used as the material for the solid particle.

<1-2-2. Method for Producing Solid Particle>

The solid particle can be produced by a conventional method. As such a method, for example, there may be mentioned a sol-gel method which is a chemical technique, a gas evaporation method which is a physical method, and so on.

<1-3. Relationship Between Hollow Particle and Solid Particle>

In an embodiment of the antireflection laminate of the present invention, the average particle diameter A of the solid particles preferably has the following relationship with the average particle diameter B of the hollow particles:

10 nm≤A≤40 nm;

30 nm≤B≤60 nm; and

A≤B, and "A+10≤B" is more preferable than "A≤B".

Also in the antireflection laminate of the present invention, the refractive index layer preferably contains the solid particles of 5 to 50 parts by weight with respect to the hollow particles of 100 parts by weight. Because of this, the solid particles enter and densely fill the space between the hollow particles in the refractive index layer, so that it is particularly highly effective in increasing the abrasion resistance, especially steel wool resistance, of the layer surface.

In other embodiment of the antireflection laminate of the present invention, the average particle diameter A of the solid particles preferably has the following relationship with the average particle diameter B of the hollow particles:

30 nm≤A≤100 nm;

30 nm≤B≤60 nm; and

A>B, and "A≥B+10" is more preferable than A>B.

Also in the antireflection laminate of the present invention, the refractive index layer preferably contains the solid particles of 5 to 50 parts by weight with respect to the hollow particles of 100 parts by weight. Because of this, the volume fraction of the solid particles in the refractive index layer is increased, so that it is particularly highly effective in decreasing the reflectivity of the refractive index layer.

In hollow and solid particles subjected to a conventional surface treatment, when the solid particles are larger than the hollow particles, there is a low affinity between the different kinds of particles, so that aggregation is likely to occur between the same kind of particles, resulting in an increase in haze. In contrast, by performing the surface treatment of the present invention on hollow and solid particles, even in the case where the solid particles are larger than the hollow particles, there is a high affinity between the different kinds of particles, so that the different kinds of particles are likely to be uniformly and densely filled in the layer. Furthermore, because the particles having a large particle diameter are mixed together, the space between the filled particles becomes large, and air is present in the space. Accordingly, by setting the content of the hollow particles within the above range, the low refractive index layer of the present invention is highly effective in decreasing reflectivity.

The thickness of the outer shell layer of the hollow particle of the present invention is normally 1 nm or more, preferably 2 nm or more. By setting the thickness of the outer shell layer within this range, it becomes easy to cover the particle excellently, and other components such as the ionizing radiation curable resin are less likely to enter the inside of the particle. As a result, a decrease in the hollow or porous structure inside the particles is reduced, and it becomes easy to decrease the refractive index of the hollow particle, therefore. On the other hand, the thickness of the outer shell layer of the hollow particle is normally 30 nm or less, preferably 20 nm or less. By setting the thickness of the outer shell layer within this range, it becomes easy to decrease the refractive index of the hollow particle without decreasing the porosity of the particle.

<1-4. Crosslinkable Group>

The surface of the hollow particle and that of the solid particle are modified with the crosslinkable groups which have an identical structure or, even if they are different in structure, a similar structure in which the ionizing radiation curable groups are common in framework and only different in the presence of one hydrocarbon group having one to three carbon atoms; the binding groups are common in framework; groups that are other than the spacer moieties and are bound to the binding groups are only different in the presence of one hydrocarbon group having one to three carbon atoms; and the spacer moieties are common in framework and only different in the presence of one hydrocarbon group having one to three carbon atoms or one functional group having one to three constituent atoms including a heteroatom but not hydrogen, or in the presence of one to two carbon atoms in a carbon chain of the framework. As the compound which can be the crosslinkable groups, for example, there may be mentioned coupling agents, and silane coupling agents are preferred as the coupling agents. A silyloxy moiety of each of the silane coupling agents can be the binding group by hydrolysis.

As the silane coupling agents that are preferably used in the present invention, for example, there may be mentioned 3-methacryloxypropyltrimethoxysilane, 3-methacryloxypropyltriethoxysilane, 3-acryloxypropyltrimethoxysilane, 3-acryloxypropyltriethoxysilane, 3-methacryloxypropylmethyldimethoxysilane, 3-methacryloxypropylmethyldiethoxysilane, 2-methacryloxypropyltrimethoxysilane and 2-methacryloxypropyltriethoxysilane.

<1-4-1. Binding Group>

The binding group is a moiety which can bind the crosslinkable group to the hollow particle and the solid particle, and it means a group that can form a covalent bond with the hollow particle and the solid particle. Taking 3-methacryloxypropyltrimethoxysilane, which is one of the above-mentioned silane coupling agents, as a specific example of the binding group, in the following chemical formula (1), a —Si(OCH$_3$)$_3$ moiety 2 of each of silane coupling agents 1 (3-methacryloxypropyltrimethoxysilane) can be hydrolyzed and changed into a binding group: —Si(OH)$_3$.

Chemical formula 1

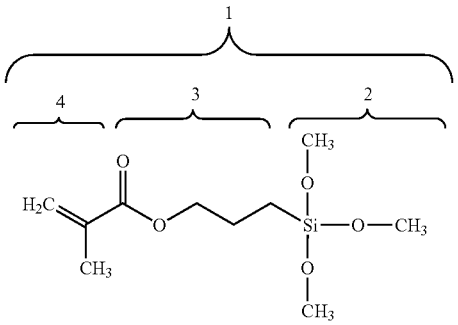

<1-4-2. Spacer Moiety>

The spacer moiety of the present invention is a moiety which connects, in the crosslinkable group, the binding group to the ionizing radiation curable group that will be described below, and functions to provide the crosslinkable group with an affinity for the ionizing radiation curable resin that comprises an organic component. Taking 3-methacryloxypropyltrimethoxysilane, which is one of the above-mentioned silane coupling agents, as a specific example of the spacer moiety, in the chemical formula (1), a —COO(CH$_2$)$_3$ moiety 3 of the silane coupling agent 1 (3-methacryloxypropyltrimethoxysilane) corresponds to the spacer moiety.

<1-4-3. Ionizing Radiation Curable Group>

The ionizing radiation curable group of the present invention is a functional group which can promote a polymerization reaction or crosslinking reaction with the ionizing radiation curable resin by irradiation with ionizing radiation, which resin is an essential component for forming a refractive layer, and thus can be cured. The ionizing radiation curable group is allowed to have a function of increasing the strength of the refractive index layer by polymerization with the resin.

As such an ionizing radiation curable group, for example, there may be mentioned a group which can promote a polymerization reaction such as a photo-radical polymerization, a photo-cationic polymerization and a photo-anionic polymerization, or can promote a reaction in the reaction form of addition polymerization that proceeds through photodimerization, condensation polymerization or the like. Especially, a group having an ethylenically unsaturated bond such as a (meth)acryloyl group, a vinyl group and an allyl group can cause a photo-radical polymerization reaction directly by irradiation with ionizing radiation such as ultraviolet rays and electron beams, or indirectly by irradiation with ionizing radiation by the action of an initiator; therefore, handling of the reaction is relatively easy even in a photo curing step. Among them, a (meth)acryloyl group is preferred as the ionizing radiation curable group because of its excellent productivity and ease in controlling the mechanical strength of the refractive index layer after being cured. In the present invention, "(meth)acryloyl" means acryloyl and/or methacryloyl.

Taking 3-methacryloxypropyltrimethoxysilane, which is one of the above-mentioned silane coupling agents, as a specific example of the ionizing radiation curable group, in the chemical formula (1), a CH$_2$═C(CH$_3$)— moiety 4 of the silane coupling agent 1 (3-methacryloxypropyltrimethoxysilane) corresponds to the ionizing radiation curable group.

FIGS. 1 and 2 are views schematically showing a modification mechanism of the particle surface in the case of taking silane coupling agents, which is one of compounds that will become the crosslinkable groups, as an example.

FIG. 1 shows that in the first step, silane coupling agents 101 become crosslinkable groups 102 through a hydrolysis reaction 110, which are crosslinkable groups having a binding group(s) each;

in the following second step, the crosslinkable groups 102 become crosslinkable groups 104 which are bound to polar groups 103 on the particle surface by hydrogen bonding 111; and in the third step, the crosslinkable groups 104 which are bound to the polar groups with two or more hydrogen bonds are subjected to heating and dehydration reaction 112, thereby producing a particle 105 that is a target particle of which surface is modified with the crosslinkable groups.

FIG. 2 shows that in the first step, silane coupling agents 101 become crosslinkable groups 102 through a hydrolysis reaction 110, which are crosslinkable groups having a binding group each;

in the following second step, the crosslinkable groups 102 become a dehydration-condensed crosslinkable group(s) 106 through a dehydration-condensation reaction 113;

in the third step, the dehydration-condensed crosslinkable group 106 becomes a dehydration condensate 107 of a crosslinkable group which is bound to polar groups 103 on the particle surface by hydrogen bonding 111; and in the fourth step, the dehydration condensate 107 is subjected to heating and dehydration reaction 112, thereby producing a particle 108 that is a target particle of which surface is modified with a dehydration-condensed crosslinkable group(s).

To modify the surface of the silica particles with more crosslinkable groups, as an example, the amount of the silane coupling agents used for treating the silane particles is preferably 1% by weight or more, more preferably 2% by weight or more, with respect to the silica particles. Because of this, the affinity of the silica particles for the an ionizing radiation curable resin composition can be excellent. On the other hand, the amount of the silane coupling agents used for treating the silica particles is preferably 50% by weight or less, more preferably 30% by weight or less, with respect to the silica particles. Because of this, it is possible to excellently prevent the silane coupling agents from being left unused in the treatment of the silica particles and thus to prevent free silane coupling agents from being produced; therefore, the restoring property of the refractive index layer is increased against external impact, and thus the refractive index layer can be prevented from being broken or scratched.

A conventional method can be employed to modify the surface of the silica particles with the silane coupling agents and is not particularly limited as long as the method can increase the dispersibility of the silica particles in organic solvents and the affinity of the same for the ionizing radiation curable resin. For example, the surface of the silica particles can be modified by adding a predetermined amount of the silane coupling agents to a dispersion of the silica particles and performing an acid treatment, an alkali treatment or a heating treatment thereon as needed.

In the case of using silane coupling agents other than the above, the silane coupling agents can be determined as a suitable one or not by checking whether the particle surface that is modified with the silane coupling agents is hydrophobic or hydrophilic. More specifically, the suitability of the silane coupling agents can be determined in such a manner that the particle surface is modified with the same; after drying, by using an agate mortar or the like, the particles are ground to a fine powder of 1 mm or less in size; finally, the suitability of the silane coupling agents is determined by whether or not the fine powder can float on water.

In the present invention, not all of the silane coupling agents have to be introduced onto the surface of the silica particles, and can be present, as a monomer or polymer, in the refractive index layer forming composition comprising the ionizing radiation curable resin, etc. The silane coupling agents have an excellent affinity for the ionizing radiation curable resin and the silica particles, so that the silica particles can be stably dispersed in the refractive index layer forming composition. Also, when cured by irradiation with ionizing radiation or heating, the silane coupling agents are incorporated into the layer and function as a crosslinking agent, so that compared to the case where all of the silica coupling agents are introduced onto the surface of the silica particles, the performance of the refractive index layer is more likely to be increased.

The above description relates to the case of forming the hollow and solid particles with silica; however, in the case of forming the particles with materials other than silica, surface modification that is suitable for each material can be performed appropriately.

Compounds other than the above coupling agents may be used as the compound for introducing the crosslinkable groups of the present invention as long as they are provided with the above properties.

<1-5. Ionizing Radiation Curable Resin>

In the present invention, the ionizing radiation curable resin is a resin that is reactive and curable by irradiation with ionizing radiation. Preferred as the ionizing radiation curable resin are, in view of productivity, thermosetting resins, ultraviolet curing resins and resins that can be cured by heating in combination with radiation.

The content of the ionizing radiation curable resin in the refractive index layer is preferably 10% by weight or more, more preferably 20% by weight or more, particularly preferably 30% by weight or more. On the other hand, the content is preferably 70% by weight or less, more preferably 60% by weight or less, particularly preferably 50% by weight or less. By setting the content within the range, the refractive index layer is provided with a strength that has no problem in practical use while having a low refractive index.

The ionizing radiation curable resin is required to be a material which has an appropriate refractive index for ensuring antireflection performance, which is likely to ensure adhesion to the optically-transparent substrate, and which is likely to provide the refractive index layer with the mechanical strength.

Preferably, a compound having at least one or more hydrogen bond forming groups and three or more ionizing radiation curable groups in a molecule thereof, is contained in the ionizing radiation curable resin. Because of this, at least part of the ionizing radiation curable resin is formed with a compound having at least one or more hydrogen bond forming groups and three or more ionizing radiation curable groups in a molecule thereof. "Hydrogen bonding group" means a functional group that can promote a polymerization reaction or a crosslinking reaction between the same kind of functional groups or different kinds of functional groups to cure the ionizing radiation curable resin, thereby forming a coating film.

By using a compound which comprises ionizing radiation curable groups that are curable by ionizing radiation and a hydrogen bond forming group(s) that is heat-curable solely or by using a curing agent in combination when the refractive index layer forming composition is applied onto the surface of a coating object, dried and subjected to irradiation with ionizing radiation in combination with heating, chemical bonds such as crosslinking bonds are formed inside a coating film, and the coating film is likely to be cured effectively. Also in the case where the hollow particle or the solid particle is formed with an inorganic particle (especially silica), hydroxyl groups present on the particle surface and the compound are likely to form covalent bonds therebetween; moreover, the hollow particle and/or the solid particle forms a crosslinking bond with the ionizing radiation curable resin, so that the strength of the refractive index layer can be increased.

As the ionizing radiation curable group which can be used in the compound having at least one or more hydrogen bond forming groups and three or more ionizing radiation curable groups in a molecule thereof, for example, there may be mentioned a functional group which can promote a polymerization reaction such as a photo-radical polymerization, a photo-cationic polymerization and a photo-anionic polymerization, an addition polymerization that proceeds through photodimerization, or a condensation polymerization. Especially, a group having an ethylenically unsaturated bond such as a (meth)acryloyl group, a vinyl group and an allyl group can cause a photo-radical polymerization reaction directly by irradiation with ionizing radiation such as ultraviolet rays and electron beams, or indirectly by irradiation with ionizing radiation by the action of an initiator; therefore, handling of the reaction is relatively easy even in a photo curing step.

Among such functional groups, a (meth)acryloyl group is preferred because of its excellent productivity and ease in controlling the mechanical strength of the refractive index layer after being cured.

As the hydrogen bond forming group which is used in the compound having at least one or more hydrogen bond forming groups and three or more ionizing radiation curable groups in a molecule thereof, there may be mentioned an alkoxy group, a hydroxyl group, a carboxyl group, an amino group and an epoxy group, for example. Among these functional groups, a hydroxyl group has, when the hollow particle or the solid particle are formed with inorganic particles (especially silica), excellent affinity for the inorganic particles, so that it can increase the dispersibility of the inorganic particles in the refractive index layer forming composition. A hydroxyl group can be easily introduced to the compound and, in the case where the hollow particle or the solid particle are formed with inorganic particles, can be adsorbed to a hydroxyl group on the particle surface, so that the solid particles and the hollow particles can be uniformly dispersed in the refractive index layer forming composition or in the refractive index layer. Therefore, the life of the refractive index layer forming composition can be increased, and it is possible to form a refractive index layer which is less likely to cause a decrease in the transparency or strength of the layer due to aggregation of the hollow particles or the solid particles.

As the compound having at least one or more hydrogen bond forming groups and three or more ionizing radiation curable groups in a molecule thereof, normally, a compound having one or more hydrogen bond forming groups such as one or more hydroxyl groups is used. The hydrogen bond forming group may be one which is produced as a by-product upon synthesis and present as a part of a monomer. More specifically, there may be mentioned polyfunctional (meth)acrylates such as di(meth)acrylates such as ethylene glycol di(meth)acrylate and pentaerythritol di(meth)acrylate monostearate; tri(meth)acrylates such as trimethylolpropane tri(meth)acrylate and pentaerythritol tri(meth)acrylate; pentaerythritol tetra(meth)acrylate derivatives; and dipentaerythritol penta(meth)acrylate, for example.

Besides them, oligomers having one or more hydrogen bond forming groups and a number average molecular weight (polystyrene-equivalent number average molecular weight measured by gel permeation chromatography or GPC) of 20,000 or less are preferably used, such as epoxy acrylate resins having one or more hydroxyl group residues (for example, "Epoxy ester" manufactured by Kyoeisha Chemical Co., Ltd., and "Ripoxy" manufactured by Showa Highpolymer Co., Ltd.) and urethane acrylate resins (resins obtained by polyaddition of various kinds of isocyanatos and monomers via urethane bonds, each of which monomers having one or more hydroxyl groups, such as "Shiko" (trade name) manufactured by The Nippon Synthetic Chemical Industry Co., Ltd., and "Urethane acrylate" manufactured by Kyoeisha Chemical Co., Ltd.)

These monomers and oligomers are effective in increasing the crosslinking density of the layer and, because of having a small number average molecular weight of 20,000 or less, have high fluidity and excellent coatability.

Besides, as needed, reactive polymers each of which has one or more (meth)acrylate groups as a main or side chain and a number average molecular weight of 20,000 or more, and which are (co)polymers each having one or more hydrogen bond forming groups, can be also preferably used. As these reactive polymers, commercial products such as "Macromonomer" (manufactured by TOAGOSEI Co., Ltd.) can be used, or a reactive polymer having one or more (meth)acrylate groups can be obtained by preliminarily polymerizing a copolymer of methyl methacrylate and glycidyl methacrylate and then condensing the glycidyl group(s) of the copolymer with the carboxyl group (s) of a methacrylic acid or acrylic acid. In the present invention, "(co)polymer" means a polymer and/or a copolymer.

In the present invention, the properties of the refractive index layer can be easily controlled by appropriately combining a monomer and/or oligomer having a number average molecular weight of 20,000 or less with a polymer having a number average molecular weight of 20,000 or more.

The content of the compound having at least one or more hydrogen bond forming groups and three or more ionizing radiation curable groups in a molecule thereof is preferably 10 parts by weight or more, more preferably 30 parts by weight or more, with respect to the ionizing radiation curable resin of 100 parts by weight. On the other hand, the content of the compound is preferably 100 parts by weight or less with respect to the resin of 100 parts by weight. Because of this, the mechanical strength of the refractive index layer can be enhanced.

<1-6. Other Components>

In the refractive index layer forming composition to form the refractive index layer, components other than the ionizing radiation curable resin, hollow particles and solid particles, which are all essential components, may be contained if necessary as long as the advantageous effects of the present invention are not impaired. Components other than the ionizing radiation curable resin, hollow particles and solid particles include, for example, a solvent, a polymerization initiator, a curing agent, a crosslinking agent, an ultraviolet blocking agent, an ultraviolet absorbing agent, a surface modifying agent (leveling agent), etc. Among them, the surface modifying agent, polymerization initiator and curing agent are taken as examples and will be described below.

<1-6-1. Surface Modifying Agent (Leveling Agent)>

The refractive index layer can also contain a surface modifying agent (leveling agent) which has a compatibility with all of the ionizing radiation curable resin, the hollow particles and the solid particles, and the leveling agent is preferably a silicon compound. By incorporating such a silicon-based compound in the refractive index layer, the surface of the layer can be easily planarized and provided with slipping properties which contribute to an increase in abrasion resistance that is required for the antireflection laminate to have. "Compatibility" means an affinity that makes a decrease in the transparency of the refractive index layer unrecognizable, which is due to white turbidity, an increase in haze, etc., even in the case where a silicon-based compound is added to the coating film in which the ionizing radiation curable resin, the hollow particles and the solid particles are present, in an amount that makes the flatness of the coating film or effects of the slipping properties unrecognizable.

In the present invention, part of the silicon-based compound is preferably fixed onto the outermost surface of the coating film by forming covalent bonds with the ionizing radiation curable resin by chemical reaction. Because of this, slipping properties are stably imparted to the refractive index layer, which allows the laminate to maintain its abrasion resistance for a long term.

The silicon-based compound preferably has a structure represented by the following chemical formula (2):

Chemical formula (2)

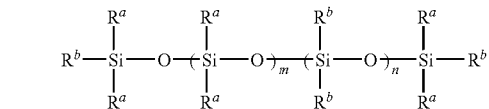

wherein $R^a$ is a alkyl or phenyl group having 1 to 20 carbon atoms, such as a methyl group; $R^b$ is an unsubstituted alkyl group having 1 to 20 carbon atoms, an alkyl group having 1 to 20 carbon atoms and being substituted with an amino group, an epoxy group, a carboxyl group, a hydroxyl group or a (meth)acryloyl group, an alkoxy group having 1 to 3 carbon atoms and being substituted with an amino group, an epoxy group, a carboxyl group, a hydroxyl group or a (meth)acryloyl group, or a polyether-modified group being substituted with an amino group, an epoxy group, a carboxyl group, a hydroxyl group or a (meth)acryloyl group; $R^a$ and $R^b$ may be the same or different from each other; m is an integer of 0 to 200; and n is an integer of 0 to 200.

It is known that silicone compounds having a basic framework as represented by the above formula are generally low in surface tension and excellent in water-repellency and releasing properties. Further effects can be imparted to silicone compounds by introducing various kinds of functional groups to a side chain or chain end thereof. For example, reactivity can be imparted by introducing an amino group, an epoxy group, a carboxyl group, a hydroxyl group, a (meth)acryloyl group, an alkoxy group, etc., so that it becomes easy for them to form a covalent bond with the ionizing radiation curable resin by a chemical reaction.

Such compounds are available as commercial products. For example, various kinds of modified silicone oils can be obtained depending on the intended purpose, such as polyether-modified silicone oil TSF4460 (product name; manufactured by GE Toshiba Silicones Co., Ltd.) and X22-164E (product name; manufactured by Shin-Etsu Silicones).

Such silicon-based compounds can be used solely or in combination of two or more kinds depending on the expected effects. By combining these compounds appropriately, it becomes possible to control various properties such as antifouling properties, water- and oil-repellent properties, slipping properties, abrasion resistance, durability, leveling properties, etc., and thus to exhibit the intended functions.

With respect to the total weight of the ionizing radiation curable resin, hollow particles and solid particles, the content of the silicon-based compound is preferably 1.5% by weight or more, more preferably 2% by weight or more, while it is preferably 5% by weight or less, more preferably 4% by weight or less. By setting the content to 2% by weight or more, sufficient slipping properties can be imparted to the antireflection laminate. By setting the content to 4% by weight or less, it becomes easy to impart strength to the coating film.

<1-6-2. Polymerization Initiator>

A polymerization initiator is not necessarily required in the present invention. However, in the case where a polymerization reaction is less likely to be caused by irradiation with ionizing radiation between the ionizing radiation curable resin, the hollow particle modified with the crosslinkable group(s), the solid particle modified with the crosslinkable group(s), and the ionizing radiation curable groups of other resin which is an optional component, it is preferable to use an appropriate initiator depending on the reaction form of said other resin and particles.

For example, in the case where the ionizing radiation curable group(s) of the ionizing radiation curable resin is a (meth)acryloyl group, a photo radical polymerization initiator is used. As the photo radical polymerization initiator, for example, there may be mentioned acetophenones, benzophenones, ketals, anthraquinones, thioxanthones, azo compounds, peroxides, 2,3-dialkyldione compounds, disulfide compounds, thiuram compounds and fluoroamine compounds. More specifically, there may be mentioned 1-hydroxy-cyclohexyl-phenyl-ketone, 2-methyl-1[4-(methylthio)phenyl]-2-morpholinopropane-1-on, benzyl dimethyl ketone, 1-(4-dodecylphenyl)-2-hydroxy-2-methylpropane-1-on, 2-hydroxy-2-methyl-1-phenylpropane-1-on, 1-(4-isopropylphenyl)-2-hydroxy-2-methylpropane-1-on, 2-hydroxy-1-{4-[4-(2-hydroxy-2-methyl-propionyl)-benzyl]-phenyl}-2-methyl-propane-1-on, benzophenone and so on. Among them, 1-hydroxy-cyclohexyl-phenyl-ketone, 2-methyl-1[4-(methylthio)phenyl]-2-morpholinopropane-1-on, and 2-hydroxy-1-{4-[4-(2-hydroxy-2-methyl-propionyl)-benzyl]-phenyl}-2-methyl-propane-1-on are preferred because they can, even in a small amount, initiate and promote a polymerization reaction by irradiation with ionizing radiation. Any one of the photo radical polymerization initiators can be used solely, or they can be used in combination. They can be commercial products, and, for example, 2-hydroxy-1-{4-[4-(2-hydroxy-2-methyl-propionyl)-benzyl]-phenyl}-2-methyl-propane-1-on is available under the product name of Irgacure 127 (Irgacure is a trademark) from Ciba Specialty Chemicals, Inc.

In the case of using a photo radical polymerization initiator, the photo radical polymerization initiator is preferably mixed in an amount of 3 parts by weight or more and 15 parts by weight or less with respect to a total of 100 parts by weight of the resin component which mainly comprises the ionizing radiation curable resin.

<1-6-3. Curing Agent>

A curing agent is generally mixed to promote a thermosetting reaction of the hydrogen bond forming group(s) contained in part of the ionizing radiation curable resin. Also in the case where the hollow particles and the solid particles are formed with silica, and at least part of the particles are surface-treated silica particles, a curing agent is mixed to promote a thermosetting reaction of silanol groups that are present on the surface of the surface-treated silica particle, silane coupling agents used for surface treatment, and an unreacted part of condensates of the silane coupling agents, etc.

In the case where the thermosetting polar group is a hydroxyl group, as the curing agent, normally, there may be mentioned compounds having a basic group(s), such as methylolmelamine, or compounds having a hydrolyzable group(s) that produces a hydroxyl group(s) by hydrolysis, such as metallic alkoxides. As the basic group, an amine group, a nitrile group, an amide group or an isocyanate group is preferably used. As the hydrolyzable group, an alkoxy group is preferably used. In the latter case, especially, aluminum compounds represented by the following chemical formula (3) and/or derivatives of the compounds are particularly preferably used because of having good compatibility with the hydroxyl group:

$$AlR_3 \quad \text{Chemical formula (3)}$$

wherein residues $R_3$ can be the same or different from each other; each of the residues is a halogen, an alkyl, alkoxy or acyloxy having 10 or less carbon atoms, preferably 4 or less carbon atoms, or a hydroxy; all or part of the residues can be replaced with a chelating ligand each.

The compound can be selected from aluminum compounds and/or oligomers derived from the compounds and/or complexes derived from the compounds, and aluminum salts of inorganic acids or aluminum salts of organic acids.

More specifically, there may be mentioned aluminum-sec-butoxide, aluminum-iso-propoxide, and acetylacetones thereof, ethyl acetoacetate, alkanolamines, glycols, and derivatives and complexes thereof, etc.

In the case of using a curing agent, the curing agent is preferably mixed in an amount of 0.05 part by weight or more and 30.0 parts by weight or less, with respect to a total of 100 parts by weight of the resin component which mainly comprises the ionizing radiation curable resin.

<1-7. Refractive Index Layer>

The refractive index layer comprising the above components is generally formed as follows: a solvent is mixed with the above-mentioned essential components and other components as needed, and a dispersion treatment is performed thereon by a common preparation method to produce a refractive index layer forming composition; and then, the composition is applied onto a substrate and dried, thereby forming a refractive index layer. A solvent is needed depending on the viscosity and fluidity of the mixture of the above components, so that the refractive index layer forming composition can be formed without using the solvent. Hereinafter, the solvent, the method for preparing the refractive index layer forming composition, and the method for forming the refractive index layer will be described.

<1-7-1. Solvent>

In the case of using the ionizing radiation curable resin in a relatively large amount, the monomer and/or oligomer in the resin can also function as a liquid medium, so that there may be a case where the resin component can be formed into the state of the refractive index layer forming composition without using a solvent. Accordingly, after dissolving and dispersing the solid component and controlling the concentration, a solvent can be used for preparing a refractive index layer forming composition having excellent coatability The solvent that is used to dissolve and disperse the solid component of the refractive index layer is not particularly limited. As the solvent, there may be mentioned various kinds of organic solvents including alcohols such as isopropyl alcohol, methanol and ethanol; ketones such as methyl ethyl ketone, methyl isobutyl ketone and cyclohexanone; esters such as ethyl acetate and butyl acetate; halogenated hydrocarbons; aromatic hydrocarbons such as toluene and xylene; or mixtures thereof.

Among the mediums, ketone organic solvents are preferably used. When the refractive index layer forming composition is prepared by using a ketone solvent, it becomes easy to apply the composition thinly and evenly to the surface of an optically-transparent substrate or to the surface of the substrate of the antireflection laminate. In addition, after applying the composition, the solvent is evaporated at a moderate evaporation rate, and drying ununiformity is less likely to occur; therefore, a coating film with a large area and uniform thickness can be easily obtained.

Another reason why it is preferable to use a ketone-based organic medium as the medium is because the composition can be applied evenly even in the case of forming a refractive index layer on a hard coat (antiabrasion) layer which has fine concavoconvexes on the surface thereof. In particular, in the case of using a hard coat layer as a substrate-side support layer of the antireflection laminate, there may be a case where, to provide the layer with an antiglare layer function, the surface of the hard coat layer is formed into the shape of fine concavoconvexes, and on the surface, a refractive index layer is formed as a low refractive index layer via a medium or high refractive index layer, or not via a medium or high refractive index layer. When the refractive index layer forming composition is prepared by using a ketone-based solvent, the composition can be evenly applied onto such a surface that is shaped into fine concavoconvexes, and it is easy to prevent coating unevenness. The hard coat layer, the medium refractive index layer, and the high refractive index layer will be described later.

As the ketone-based solvent, there may be mentioned individual solvents which consist of one kind of ketone, mixed solvents which consist of two or more kinds of ketones, and mixed solvents which contain one or more kinds of ketone solvents in combination with other kind of solvent but still retain the characteristics as a ketone solvent. Among them, mixed solvents which contain one or more kinds of ketone solvents in combination with other kind of solvent are preferably used, and in this case, it is preferable that the ketone-based solvent is contained so as to account for 70% by weight, particularly preferably 80% by weight, of the total solvent.

The amount of the solvent is appropriately adjusted so as to achieve a concentration at which the components can be uniformly dissolved and dispersed, aggregation of the hollow and solid particles can be prevented, and the composition is not too much diluted upon coating. It is preferable to prepare a highly-concentrated refractive index layer forming composition by decreasing the added amount of the solvent within the range that satisfies the condition. Because of this, the composition can be stored with a low volume and can be used by being diluted at an appropriate concentration upon coating. A refractive index layer forming composition that is particularly excellent in dispersion stability and suitable for long term storage can be obtained by using the solvent in an amount of, when the total amount of the solid content and solvent is 100 parts by weight, 50 to 95.5 parts by weight with respect to the total solid content of 0.5 to 50 parts by weight, more preferably 70 to 90 parts by weight with respect to the total solid content of 10 to 30 parts by weight.

<1-7-2. Method for Preparing Refractive Index Layer Forming Composition>

The refractive index layer forming composition can be prepared by mixing the above-mentioned essential components and desired components in an optional order. When the hollow particles or the solid particles are colloidal, they may be mixed as they are. When the hollow particles and the solid particles are powdery, a medium such as beads is added to the thus-obtained mixture and appropriately dispersed with a paint shaker or beads mill, thereby obtaining the refractive index layer forming composition.

<1-7-3. Method for Forming Refractive Index Layer>

To form the refractive index layer, the refractive index layer forming composition obtained as above is applied onto a coating object, dried, and then cured by irradiation with ionizing radiation and/or heating.

As the method for applying the refractive index layer forming composition, for example, there may be mentioned a spin coating method, a dip method, a spraying method, a slide coating method, a bar coating method, a roll coating method, a meniscus coating method, a flexographic printing method, a screen printing method, a screen printing method, and a bead coating method. Also, a known method may be used as the method of drying or of irradiation with ionizing radiation and/or heating after coating.

The thickness of the refractive index layer obtained by applying the refractive index layer forming composition is preferably 0.05 µm or more and 0.15 µm or less. By setting the thickness of the refractive index layer to 0.05 µm or more, the refractive index layer can obtain sufficient film-forming properties. Also by setting the thickness of the refractive index layer to 0.15 µm or less, it is possible to decrease the cost of raw materials.

<2. Antireflection Laminate>

The antireflection laminate of the present invention comprises a transparent resin substrate and a refractive index layer as essential elements, and can be provided with a functional layer(s) such as a hard coat layer, an antiglare layer and an antistatic layer to increase the strength and/or optical characteristics of the laminate.

<2-1. Layer Structure of Antireflection Laminate>

FIG. 3 schematically shows a sectional view of an example of the antireflection laminate according to the present invention. In the sectional views shown in FIG. 3 and the following figures, for ease of description, the scale of thickness direction (vertical direction of the figures) is enlarged and stretched larger than the scale of planar direction (horizontal direction of the figures). In an antireflection laminate 10 shown in FIG. 3, a hard coat layer 40 and a refractive index layer (low refractive index layer) 30 are formed on an observer 80-side surface of a transparent resin substrate 20 in this order, closest to the transparent resin substrate 20 to farthest.

In the antireflection laminate of the present invention, the refractive index layer is preferably provided on one outermost surface of a transparent resin substrate directly or via other layer as a low refractive index layer that is smallest in refractive index. The other layer is preferably a hard coat layer. Because of having such a layer structure, the refractive index layer which is low in refractive index and excellent in abrasion resistance is provided on the surface of the antireflection laminate which is closest to the observer, so that the reflectivity of a display surface is decreased, thereby obtaining excellent visibility. Also, because the refractive index layer is provided to the observer side of the transparent resin substrate via the hard coat layer, when the refractive index layer is subjected to an impact which is beyond the level that it can allow, the hard coat layer can decrease the damaged area of the refractive index layer and protect the transparent resin substrate and other layers present on the display side.

Hereinafter, other functional layers comprising the antireflection laminate of the present invention will be described in order, such as a transparent resin substrate which is an essential substrate other than the refractive index layer, and a hard coat layer which is provided as needed.

<2-2. Transparent Resin Substrate>

The transparent resin substrate comprising the antireflection laminate can be in the form of a plate or in the form of a film (or sheet; hereinafter, "film" is referred to as "sheet"); however, the substrate is preferably a thin substrate because optical layers such as the refractive index layer and the hard coat layer are provided thereon. The higher the transparency of the transparent resin substrate the better; however, preferred is a light transparency that gives a light transmittance of 70% or more, more preferably 80% or more, in the visible light range of 380 to 780 nm. A spectrophotometer (such as UV-3100PC manufactured by Shimadzu Corporation) is used for light transmittance measurement, and values measured at room temperature in the air can be used.

Preferred as the substrate are, for example, films which are formed with various kinds of resins such as triacetate cellulose (TAC), polyethylene terephthalate (PET), diacetyl cellulose, acetate butyrate cellulose, polyethersulfone, acrylic resin, polyurethane resin, polyester, polycarbonate, polysulphone, polyether, trimethylpentene, polyether ketone, (meth) acrylonitrile and cyclic polyolefin.

The thickness of the substrate is preferably 30 μm or more, more preferably 50 μm or more, while the thickness of the substrate is preferably 200 μm or less.

In the case of using a thermosetting polar group(s) in the ionizing radiation curable resin, the refractive index layer forming composition is applied onto the surface of the transparent resin substrate, which is a coating object, directly or via other layer such as a hard coat layer, and then dried and cured, thereby obtaining excellent adhesion of the resulting coating film to the surface of the coating object surface, by the action of the polar group(s).

<2-3-1. Hard Coat Layer>

In the antireflection laminate of the present invention, the refractive index layer is preferably provided onto the observer side of the transparent resin substrate via a hard coat layer. Because of such a layer structure, when the refractive index layer is subjected to an impact that is beyond the level that it can allow, the hard coat layer functions to decrease the damaged area of the refractive index layer and protect the transparent resin substrate and other layers present on the display side.

In general, the hard coat layer is formed with an ionizing radiation curable resin. In the present invention, "hard coat layer" is a layer which shows a hardness of H or more on the pencil hardness test defined by JIS K5600-5-4 (1999).

As the ionizing radiation curable resin for forming the hard coat layer, there may be preferably mentioned resins having an acrylic functional group(s). More specifically there may be mentioned polyester resins having a relatively low molecular weight, polyether resins having a relatively low molecular weight, acrylic resins having a relatively low molecular weight, epoxy resins having a relatively low molecular weight, urethane resins having a relatively low molecular weight, alkyd resins having a relatively low molecular weight, spiroacetal resins having a relatively low molecular weight, polybutadiene resins having a relatively low molecular weight, polythiol polyether resins having a relatively low molecular weight, polyalcohols having a relatively low molecular weight, etc. Also, there may be mentioned monomers of polyfunctional compounds including the following: di(meth)acrylates such as ethylene glycol di(meth)acrylate and pentaerythritol di(meth)acrylate monostearate; tri(meth)acrylates such as trimethylolpropane tri(meth)acrylate and pentaerythritol tri(meth)acrylate; and polyfunctional(meth)acrylates such as pentaerythritol tetra(meth)acrylate derivatives and dipentaerythritol penta(meth)acrylate; and oligomers such as epoxy acrylate and urethane acrylate.

Also, it is possible to use a hard coat layer which is provided with a hardness that is increased by using an inorganic or organic particle of which surface is covered without deteriorating its transparency and forming a covalent bond(s) between the particle and a hard coat component.

The photo polymerization initiator which is used in combination with the ionizing radiation curable resin, the method for forming a film, and so on are appropriately selected from those described above.

The thickness of the cured hard coat layer is preferably 0.1 μm or more, more preferably 0.8 μm or more, while the thickness is preferably 100 μm or less, more preferably 20 μm or less. By setting the thickness to 0.1 μm or more, it becomes easy to obtain sufficient hard coating performance. By setting the thickness to 100 μm or less, it becomes easy to obtain sufficient strength against external impact.

Also in the present invention, the hard coat layer comprising the ionizing radiation curable resin can also function as the medium refractive index layer, high refractive index layer, and/or antistatic layer that will be described below.

<2-3-2. Antiglare Layer>

In general, the antiglare layer comprises an ionizing radiation curable resin and a particle for an antiglare layer. By containing the particles for an antiglare layer, the antiglare layer can be provided with abrasion resistance in addition to antiglare performance.

As the ionizing radiation curable resin, one may be appropriately selected from those which are preferably used for the hard coat layer.

The shape of the particle for an antiglare layer may be spherical, for example. Spherical shapes include a perfect spherical shape and an elliptical shape, for example. Preferred for use is a particle of perfect spherical shape.

As the material for the particle for an antiglare layer, inorganic or organic materials may be used. In general, the particle for an antiglare layer exhibits antiglare properties, so that it is preferable to use transparent materials for the particle. As such a particle for an antiglare layer, there may be mentioned inorganic beads such as silica beads, and organic beads such as plastic beads.

In the case of using plastic beads, those having a refractive index of 1.40 to 1.60 are preferred. The reason why the refractive index of plastic beads is set within the above range is as follows: this is because the refractive index of ionizing radiation curable resins, especially acrylate or methacrylate resins, is normally 1.45 to 1.55, so that the antiglare properties of the coating film can be increased without deteriorating its transparency by selecting plastic beads which have a refractive index that is as close to the refractive index of the ionizing radiation curable resin as possible.

Specific examples of the plastic beads which have a refractive index that is close to the refractive index of the ionizing radiation curable resin, include acrylic beads (refractive index: 1.49) such as polymethyl methacrylate beads, polycarbonate beads (refractive index: 1.58), polystyrene beads (refractive index: 1.50), styrene beads (refractive index: 1.59), melamine beads (refractive index: 1.57), polyvinyl chloride beads (refractive index: 1.54), polyacrylic styrene beads (refractive index: 1.57), acrylic-styrene beads (refractive index: 1.54), polyethylene beads (refractive index: 1.53), etc. Plastic beads other than the above may be used if the refractive index is within the range.

The particle diameter of these particles for an antiglare layer is preferably 3 μm or more and 8 μm or less for use. With respect to the ionizing radiation curable resin of 100 parts by weight, the content of the particles for an antiglare is preferably 2 parts by weight or more, more preferably 10 parts by weight or more, while the content is preferably 30 parts by weight or less, more preferably 25 parts by weight or less.

In the case of forming the antiglare layer by applying and curing a coating liquid, it is preferable that the particles for an antiglare layer are surely dispersed in the coating liquid. In particular, when using a coating liquid in which particles for an antiglare layer are mixed with an ionizing radiation curable resin, it may be necessary to stir the particles precipitated very well to disperse them. To prevent such inconvenience and form an antiglare layer, as a precipitation prevention agent, silica beads normally having a particle diameter of 0.5 μm or less, preferably 0.1 μm or more and 0.25 μm or less, can be added to the coating liquid. The silica beads are effective in preventing precipitation of organic fillers, and the effect increases as the added amount of the silica beads increases. As a result, the transparency of a coating film may be affected. The content of the silica beads is, therefore, preferably within the range that the transparency of a coating film is not deteriorated and precipitation can be prevented. More specifically, it is preferable to add silica beads of about less than 0.1 part by weight with respect to the ionizing radiation curable resin of 100 parts by weight.

The thickness of the cured antiglare layer is preferably 0.1 μm or more, more preferably 0.8 μm or more, while the thickness is preferably 100 μm or less, more preferably 20 μm or less. By setting the thickness to 0.1 μm or more, it becomes easy to obtain sufficient hard coating performance. By setting the thickness to 100 μm or less, it becomes easy to obtain sufficient strength against external impact.

Preferably, the antiglare layer satisfies all of the relationships represented by the following four formulae:

$30 \leq Sm \leq 200$, $0.90 \leq Rz \leq 1.60$, $1.3 \leq \theta a \leq 2.5$, and $0.3 \leq R \leq 10$ wherein R (μm) is the average particle diameter of the particles for an antiglare layer; Rz (μm) is the 10-point average roughness of the concavoconvexes on the surface of the antiglare layer; Sm (μm) is the average distance between the concavoconvexes on the surface of the antiglare layer surface; and θa is the average gradient angle of the concavoconvexes.

In other preferred embodiment of the antiglare layer, preferred is an antiglare layer which satisfies the following formula and that the haze value of the inside of the antiglare layer is 55% or less:

$\Delta n = |n1 - n2| < 0.1$ wherein n1 and n2 are respectively the refractive index of the particle for an antiglare layer and that of the ionizing radiation curable resin.

<2-3-3. Antistatic Layer>

An antistatic layer can be provided to the antireflection laminate as needed to prevent static electricity and thus prevent sticking of soils, or to prevent electrostatic hazards from outside when the laminate is incorporated in a liquid crystal display or the like. In this case, the performance of the antistatic layer is preferably such that the surface resistivity of the antireflection laminate thus formed is $10^{12}\Omega/\square$ or less. However, even if the surface resistivity is $10^{12}\Omega/\square$ or more, by providing an antistatic layer, it becomes easier to prevent sticking of soils compared to an antireflection laminate having no antistatic layer.

In the case of forming the antistatic layer with a resin, the antistatic layer contains a resin and an antistatic agent. As the resin for forming the antistatic layer, resins which are the same as those that can be used to form the hard coat layer may be used.

As the antistatic agent contained in the antistatic layer forming resin, for example, there may be mentioned the following: cationic antistatic agents having a cationic group(s) such as a quaternary ammonium salt, a pyridinium salt and a primary to tertiary amino group; anionic antistatic agents having an anionic group(s) such as a sulfonic acid base, a sulfuric ester base, a phosphoric ester base and a phosphoric acid base; amphoteric antistatic agents such as amino acid-based antistatic agents and amino acid sulfate-based antistatic agents; nonionic antistatic agents such as amino alcohol-based antistatic agents, glycerin-based antistatic agents and polyethylene glycol-based antistatic agents; an electroconductive polymer of a combination of a dopant with an electroconductive polymer such as polyacetylene, polyaniline and polythiophene, such as 3,4-ethylenedioxythiophene (PEDOT); surfactant type antistatic agents including organometallic compounds such as tin alkoxide and titanium alkoxide, and metal-chelate compounds such as acetylacetonato salts thereof; and high-molecular-weight antistatic agents prepared by increasing the molecular weight of the above antistatic agents. Furthermore, there may be mentioned polymerizable antistatic agents such as monomers and oligomers each of which has a tertiary amino group, a quaternary ammonium group or a metal chelate moiety and are polymerizable by irradiation with ionizing radiation, and organometallic compounds such as coupling agents which have a functional group(s) that is polymerizable by irradiation with ionizing radiation.

Other antistatic agents include fine particles having a particle diameter of 100 nm or less, such as tin oxide, tin-doped indium oxide (ITO), antimony-doped tin oxide (ATO), indium-doped zinc oxide (AZO), antimony oxide and indium oxide. Especially, by setting the particle diameter to 100 nm or less, which is less than the wavelength of visible light, it becomes easy to impart transparency to the antistatic layer, thereby obtaining an effect that the transparency of the antireflection laminate is less likely to be impaired.

By mixing the antistatic agent with a coating liquid for forming the hard coat layer or antiglare layer, it becomes easy to obtain a coating film that is improved in both of antistatic performance and hard coating performance, or antistatic performance and antiglare performance.

<2-3-4. High Refractive Index Layer and Medium Refractive Index Layer (Refractive Index Layers Having a Refractive Index of 1.46 to 2.00)>

In general, each of the high refractive index layer and medium refractive index layer mainly comprises an ionizing radiation curable resin and a particle for controlling the refractive index. As the ionizing radiation curable resin, resins which are the same as those that can be used to form the hard coat layer can be used. The photo polymerization initiator, additives, method and so on which are used as needed can be the same as those of the hard coat layer.

As the particle for controlling the refractive index, for example, there may be mentioned a fine particle having a particle diameter of 100 nm or less. As such a particle, there may be mentioned one or more kinds of fine particles selected from the group consisting of zinc oxide (refractive index: 1.90), titania (refractive index: 2.3 to 2.7), ceria (refractive index: 1.95), tin-doped indium oxide (refractive index: 1.95), antimony-doped tin oxide (refractive index: 1.80), yttria (refractive index: 1.87) and zirconia (refractive index: 2.0).

As the particle for controlling the refractive index, it is preferable to use a particle which has a refractive index that is higher than the refractive index of the ionizing radiation curable resin. The refractive index depends on the content of the particles for controlling the refractive index in the high refractive index layer and the medium refractive index layer. That is, the larger the content of the particles for controlling the refractive index, the higher the refractive index. Accordingly, it is possible to set the refractive index within the range of 1.46 to 2.00 freely by changing the component ratio of the ionizing radiation curable resin to the particles.

Each of the medium refractive index layer and the high refractive index layer can be a deposited layer that is formed by depositing an inorganic oxide having a high refractive index, such as titanium oxide and zirconium oxide, by a deposition method such as a chemical vapor deposition method (CVD) and a physical vapor deposition method (PVD), or can be a coating film in which inorganic oxide particles having a high refractive index, such as titanium oxide, are dispersed. As the medium refractive index layer, an optically transparent layer having a refractive index of 1.46 to 1.80 is used. As the high refractive index layer, an optically transparent layer having a refractive index of 1.65 or more is used.

In the case of providing the medium refractive index layer and/or the high refractive index layer to the antireflection laminate of the present invention, the medium refractive index layer and/or the high refractive index layer is provided in the position that is closer to the display than the above-mentioned refractive index layer (low refractive index layer). Furthermore, in the case of providing the medium refractive index layer and the high refractive index layer, to decrease reflectivity, the medium refractive index layer, the high refractive index layer and the low refractive index layer are provided in this order, closest to the display side to farthest. In this embodiment, in the case of providing a hard coat layer further, the hard coat layer is provided on the transparent resin substrate-side surface of the medium refractive index layer.

<2-4. Other Examples of Layer Structure of Antireflection Laminate>

FIGS. 4 to 7 are sectional views schematically showing other example of the layer structure of the antireflection laminate of the present invention.

FIG. 4 shows an antireflection laminate 10 in which a refractive index layer (low refractive index layer) is provided on an observer 80 side of a transparent resin substrate 20.

FIG. 5 shows an antireflection laminate 10 in which a high refractive index layer 50 and a refractive index layer (low refractive index layer) are provided in this order, from the side closest to the transparent resin substrate to farthest, on an observer 80 side of a transparent resin substrate 20.

FIG. 6 shows an antireflection laminate 10 in which a hard coat layer 40, a medium refractive index layer 60, a high refractive index layer 50 and a refractive index layer (low refractive index layer) 30 are provided in this order, from the side closest to the transparent resin substrate to farthest, on an observer 80 side of a transparent resin substrate 20.

FIG. 7 shows an antireflection laminate 10 in which an antistatic layer 70, a hard coat layer 40, a high refractive index layer 50 and a refractive index layer (low refractive index layer) 30 are provided in this order, from the side closest to the transparent resin substrate to farthest, on an observer 80 side of a transparent resin substrate 20.

The present invention is not limited to the above-mentioned embodiments. The embodiments are examples, and any that has the substantially same essential features as the technical ideas described in claims of the present invention and exerts the same effects and advantages is included in the technical scope of the present invention.

EXAMPLES

The present invention will be hereinafter explained in more detail by way of examples. The scope of the present invention is not restricted by these examples.

<3-1-1. Preparation of Surface-Modified Hollow Particles (Surface-Modified Hollow Silica Fine Particles A)>

Solvent replacement was performed on a dispersion of hollow silica fine particles in isopropanol (manufactured by Catalysts & Chemicals Industries Co., Ltd.), as hollow particles, to replace isopropyl alcohol with methyl isobutyl ketone (hereinafter may be referred to as MIBK) by means of a rotary evaporator, thereby obtaining a dispersion of 20% by weight of hollow silica fine particles in methyl isobutyl ketone. Then, 3-methacryloxypropylmethyldimethoxysilane of 5% by weight was added to the methyl isobutyl ketone dispersion of 100% by weight, followed by heating treatment at 50° C. for one hour, thereby obtaining a dispersion of 20% by weight of surface-treated hollow silica fine particles in methyl isobutyl ketone.

<3-1-2. Preparation of Surface-Modified Hollow Particles (Surface-Modified Hollow Silica Fine Particles C)>

Solvent replacement was performed on a dispersion of hollow silica fine particles in isopropanol (manufactured by Catalysts & Chemicals Industries Co., Ltd.), as hollow particles, to replace isopropyl alcohol with methyl isobutyl ketone (hereinafter may be referred to as MIBK) by means of a rotary evaporator, thereby obtaining a dispersion of 20% by weight of hollow silica fine particles in methyl isobutyl ketone. Then, 3-glycidyloxypropylmethyldimethoxysilane of 5% by weight was added to the methyl isobutyl ketone dispersion of 100% by weight, followed by heating treatment at 50° C. for one hour, thereby obtaining a dispersion of 20% by weight of surface-treated hollow silica fine particles in methyl isobutyl ketone.

<3-2-1. Preparation of Surface-Modified Solid Particles (Surface-Modified Solid Silica Fine Particles A)>

3-methacryloxypropylmethyldimethoxysilane of 5% by weight was added to 100 parts by weight of, as solid particles, a silica sol dispersed in methyl isobutyl ketone (product name: MIBK-ST; silica solid content: 20% by weight; manufactured by: Nissan Chemical Industries, Ltd.), followed by heating treatment at 50° C. for one hour, thereby obtaining a dispersion of 20% by weight of surface-treated solid silica fine particles in methyl isobutyl ketone.

<3-2-2. Preparation of Surface-Modified Solid Particles (Surface-Modified Solid Silica Fine Particles B)>

In dried air, isophorone diisocyanate of 20.6% by weight was added dropwise with stirring at 50° C. for one hour to a solution of mercaptopropyltrimethoxysilane of 7.8% by weight and dibutyltin dilaurate of 0.2% by weight, followed by stirring at 60° C. for three hours. To the resulting mixture, pentaerythritol triacrylate of 71.4% by weight was added dropwise at 30° C. for one hour, followed by heating and stirring at 60° C. for three hours, thereby obtaining a compound (1). Next, under a nitrogen flow, a mixed solution of Methanol silica sol (product name; a dispersion of colloidal silica in a methanol solvent; silica solid content: 30% by weight; manufactured by: Nissan Chemical Industries, Ltd.) of 88.5% by weight (solid content: 26.6% by weight), the synthesized compound (1) of 8.5% by weight, and p-methoxyphenol of 0.01% by weight was stirred at 60° C. for 4 hours. To the resulting liquid reaction mixture, methyltrimethoxysilane of 3% by weight was added as a compound (2) and stirred at 60° C. for one hour. Thereafter, orthoformic acid methyl ester of 9% by weight was added thereto, followed by heat treatment at the same temperature for another one hour, thereby obtaining a dispersion of 35% by weight of surface-treated solid silica fine particles in methanol.

<3-2-3. Preparation of Surface-Modified Solid Particles (Surface-Modified Solid Silica Fine Particles C)>

3-glycidyloxypropylmethyldimethoxysilane of 5% by weight was added to 100 parts by weight of, as solid particles, a silica sol dispersed in methyl isobutyl ketone (product name: MIBK-ST; silica solid content: 20% by weight; manufactured by: Nissan Chemical Industries, Ltd.), followed by heating treatment at 50° C. for one hour, thereby obtaining a dispersion of 20% by weight of surface-treated solid silica fine particles in methyl isobutyl ketone.

Example 1

<3-3-1. Preparation of Low Refractive Index Layer Forming Composition>

The following components were mixed together to prepare a low refractive index layer forming composition.

Surface-modified hollow silica fine particles A (Hollow silica fine particles of 20% by weight in methyl isobutyl ketone): 15.0 parts by weight Surface-modified solid silica fine particles A (Solid silica fine particles of 20% by weight in methyl isobutyl ketone): 0.4 part by weight Pentaerythritol triacrylate (PETA): 1.2 parts by weight Dipentaerythritol hexaacrylate (DPHA): 0.4 part by weight Irgacure 127 (product name; manufactured by: Ciba Specialty Chemicals): 0.1 part by weight X-22-164E (product name; manufactured by: Shin-Etsu Chemical Co., Ltd.): 0.15 part by weight Methyl isobutyl ketone: 83.5 parts by weight

<3-3-2. Preparation of Hard Coat Layer Forming Composition>

The following components were mixed together to prepare a hard coat layer forming composition.

Surface-modified solid silica fine particles B (Solid silica fine particles of 35% by weight in methyl isobutyl ketone): 25.0 parts by weight Urethane acrylate (product name: Shiko UV1700-B; manufactured by: The Nippon Synthetic Chemical Industry Co., Ltd.): 25.0 parts by weight Irgacure 184 (product name; manufactured by: Ciba Specialty Chemicals): 0.2 part by weight Methyl ethyl ketone: 49.8 parts by weight

<3-4. Production of a Substrate/Hard Coat Layer/Low Refractive Index Layer Film>

On a triacetate cellulose (TAC) film having a thickness of 80 μm (manufactured by: Fuji Photo Film Co., Ltd.), a hard coat layer forming-composition prepared by using the above components was applied by bar coating and dried to remove the solvent therefrom. Thereafter, by means of an ultraviolet irradiation device (manufactured by: Fusion UV Systems Japan KK.; light source: H pulp), ultraviolet irradiation was performed at an irradiation dose of 10 mJ/cm$^2$ to cure the resulting hard coat layer, thereby obtaining a film comprising a substrate/hard coat layer, in which the hard coat layer had a thickness of about 15 μm.

On the thus-obtained substrate/hard coat layer film, the above low refractive index layer forming composition was applied by bar coating and dried to remove the solvent therefrom. Thereafter, by means of an ultraviolet irradiation device (manufactured by: Fusion UV Systems Japan KK.; light source: H pulp), ultraviolet irradiation was performed at an irradiation dose of 200 mJ/cm$^2$ to cure the resulting coating film, thereby obtaining an antireflection laminate comprising a substrate/hard coat layer/low refractive index layer.

The thickness of the low refractive index layer was designed so that the minimum value of reflectances measured by means of a spectrophotometer manufactured by Shimadzu Corporation (product name: UV-3100PC) could be around a wavelength of 550 nm.

Almost all the amount of PETA is polymerized, as well as DPHA, so that the content of the solid silica particles in the ionizing radiation curable resin composition can be considered to be almost the same as the content of the solid silica particles in the ionizing radiation curable resin.

The thus-obtained antireflection laminate comprising a substrate/hard coat layer/low refractive index layer was measured for the following four points.

<3-5-1. Measurement of Reflectance>

By means of a spectrophotometer manufactured by Shimadzu Corporation (product name: UV-3100PC), the antireflection laminate was measured for the minimum reflectance at the time when incident and reflection angles were 5° each.

<3-5-2. Measurement of Haze Value>

In accordance with ITIS K7105 (1981) "the test method of optical characteristics of plastics," the antireflection laminate was measured for the haze value of the outermost surface thereof.

<3-5-3. Evaluation Test of Abrasion Properties (Steel Wool Resistance)>

By means of steel wool #0000, the antireflection laminate was rubbed back and forth 20 times with different loads. Then, the presence of scratches was visually observed. The evaluation criteria are as follows:

○: No scratches are found

Δ: A few scratches (1 to 10 scratches) are found

X: A plurality of scratches (10 or more scratches) are found

<3-5-4. Evaluation Test of Hardness (Measurement of Pencil Hardness)>

Five lines were drawn on the surface of the antireflection laminate with a load of 500 g by means of a set of five given pencils. Then, the surface of the antireflection laminate was visually observed for the presence of scratches for evaluation. The pencil hardness which left no scratch was confirmed. The result is shown in Table 1.

Example 2

An antireflection laminate was produced in the same manner as in Example 1, except that the particle diameter of the surface-modified solid silica fine particles A was changed. Evaluation results are shown in Table 1, as well as the particle diameter of the surface-modified solid silica fine particles.

Example 3

An antireflection laminate was produced in the same manner as in Example 1, except that the particle diameter of the surface-modified hollow silica sol A and that of the surface-modified solid silica fine particles A were changed. Evaluation results are shown in Table 1, as well as the particle diameter of the surface-modified hollow silica sol A and that of the surface-modified solid silica fine particles A.

Example 4

An antireflection laminate was produced in the same manner as in Example 1, except that the hollow silica fine particles dispersed in MIBK was mixed with the silica sol dispersed in MIBK, and surface modification was performed on the mixture at once. Evaluation results are shown in Table 1, as well as the particle diameter of the surface-modified solid silica fine particles.

Comparative Example 1

An antireflection laminate was produced in the same manner as in Example 1, except that the surface-modified solid silica fine particles A were not used. Evaluation results are shown in Table 1.

Comparative Example 2

An antireflection laminate was produced in the same manner as in Example 1, except that an untreated MIBK-ST, which is an untreated solid silica sol dispersed in MIBK, was used in place of the surface-modified solid silica fine particles A. Evaluation results are shown in Table 1.

Comparative Example 3

An antireflection laminate was produced in the same manner as in Example 2, except that the surface-modified solid silica fine particles B were used in place of the surface-modified solid silica fine particles A. Evaluation results are shown in Table 1.

Comparative Example 4

An antireflection laminate was produced in the same manner as in Example 3, except that the surface-modified solid silica fine particles B were used in place of the surface-modified solid silica fine particles A. Evaluation results are shown in Table 1.

Comparative Example 5

A low refractive index layer forming composition was prepared in the same manner as in Example 1, except that the surface-modified solid silica fine particles A were altered to the surface-modified solid silica fine particles C, and the surface-modified hollow silica fine particles A were altered to the surface-modified hollow silica fine particles C. The resulting composition was turbid white, and at the time of producing an antireflection laminate, aggregates were found on the surface of the layer.

FIG. 6 is a sectional view schematically showing an example of an antireflection laminate according to the present invention.

FIG. 7 is a sectional view schematically showing an example of an antireflection laminate according to the present invention.

| Reference Signs List | |
|---|---|
| 1. | Silane coupling agent |
| 2. | Moiety to be binding groups |
| 3. | Spacer moiety |
| 4. | Ionizing radiation curable group |
| 10. | Antireflection laminate |
| 20. | Transparent resin substrate |
| 30. | Refractive index layer (Low refractive index layer) |
| 40. | Hard coat layer |
| 50. | High refractive index layer |
| 60. | Medium refractive index layer |
| 70. | Antistatic layer |
| 80. | Observer |

The invention claimed is:

1. An antireflection laminate which comprises a refractive index layer that has a refractive index of 1.45 or less,
    wherein the refractive index layer is a cured product obtained by irradiating a refractive index layer forming composition with ionizing radiation;
    wherein the refractive index layer forming composition comprises:
    an ionizing radiation curable resin,

TABLE 1

| | Average particle diameter of surface-modified solid silica fine particles | Average particle diameter of surface-modified hollow silica fine particles | Surface treatment of solid silica fine particle | Surface treatment of hollow silica fine particle | Reflectance | Hz | Steel Wool Resistance 300 g | 500 g | 1 kg | Pencil Hardness |
|---|---|---|---|---|---|---|---|---|---|---|
| Ex. 1 | 10 nm | 40 nm | A | A | 1.4 | 0.2 | ○ | ○ | ○ | 4H |
| Ex. 2 | 40 nm | 40 nm | A | A | 1.4 | 0.2 | ○ | ○ | ○ | 4H |
| Ex. 3 | 80 nm | 30 nm | A | A | 1.3 | 0.3 | ○ | ○ | X | 3H |
| Ex. 4 | 10 nm | 40 nm | A | A | 1.4 | 0.2 | ○ | ○ | ○ | 4H |
| C. Ex. 1 | — | 40 nm | — | A | 1.5 | 0.2 | ○ | X | X | 3H |
| C. Ex. 2 | 10 nm | 40 nm | None | A | 1.4 | 0.4 | ○ | X | X | 3H |
| C. Ex. 3 | 40 nm | 40 nm | B | A | 1.4 | 0.4 | Δ | X | X | 3H |
| C. Ex. 4 | 80 nm | 30 nm | B | A | 1.3 | 0.5 | X | X | X | H |
| C. Ex. 5 | 10 nm | 40 nm | C | C | — | 10.2 | — | — | — | — |

Figure 1:
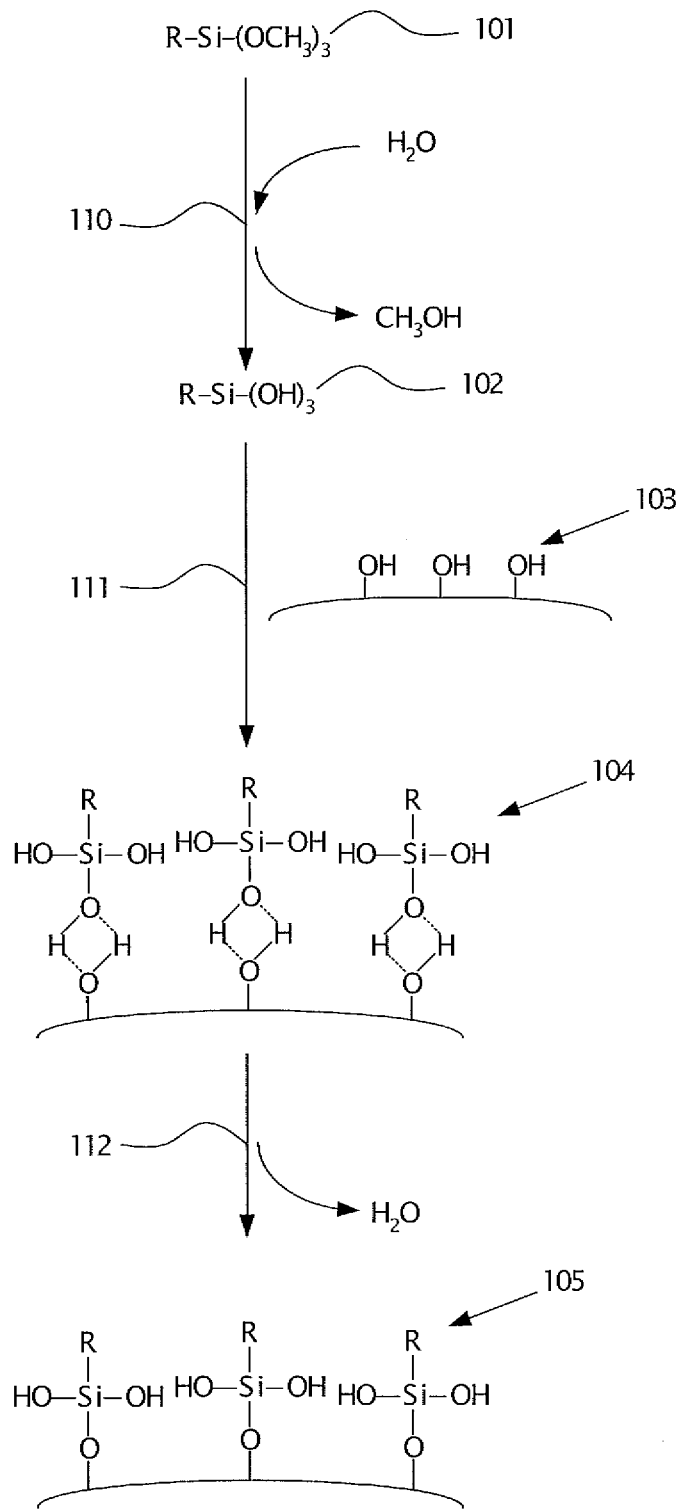
FIG. 1 is a view schematically showing a modification mechanism of particle surface with the crosslinkable groups of the present invention.
Figure 2:
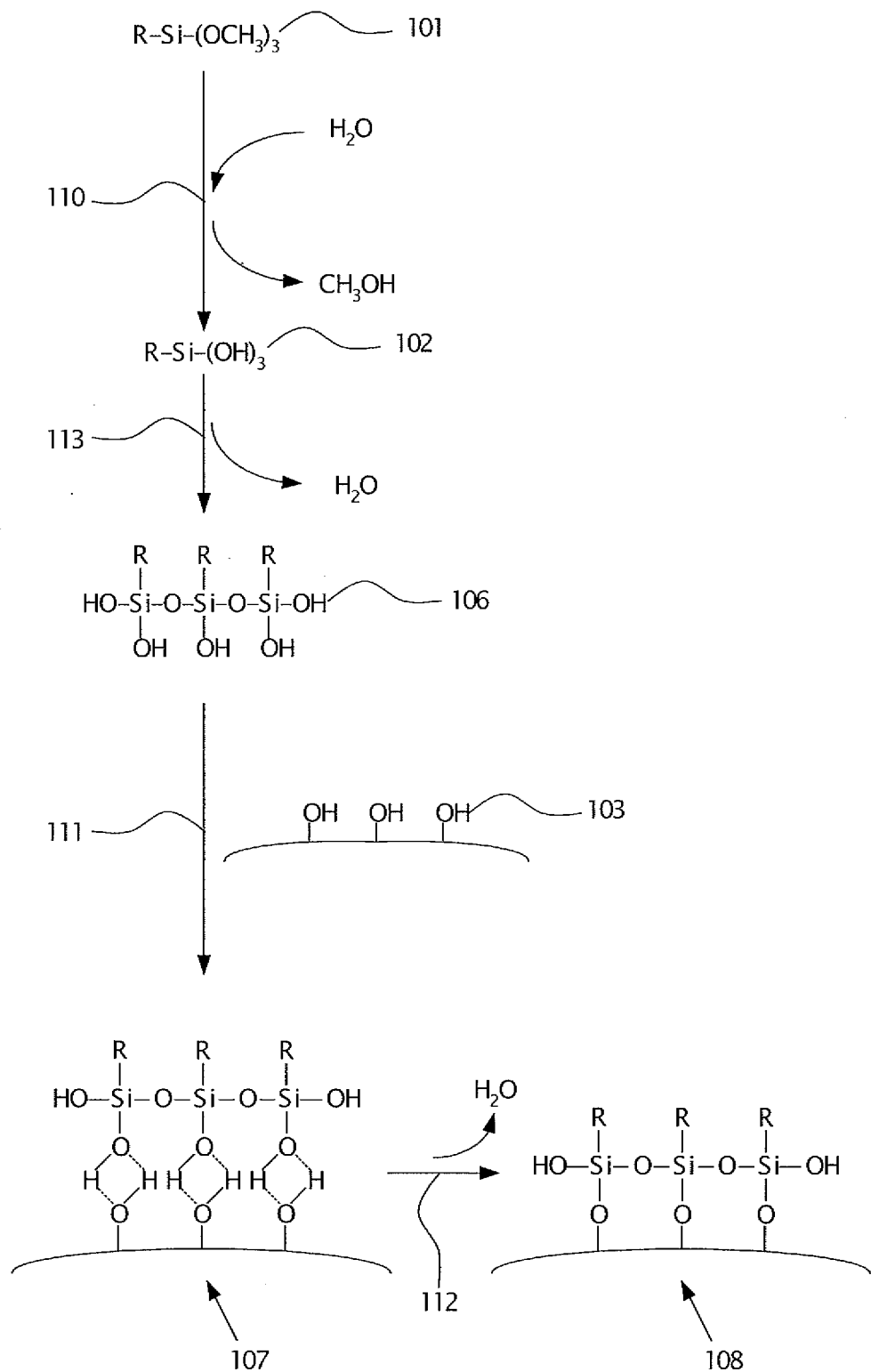
FIG. 2 is a view schematically showing a different modification mechanism of particle surface with the crosslinkable group of the present invention.
Figure 3:
FIG. 3 is a sectional view schematically showing an example of an antireflection laminate according to the present invention.
Figure 3:
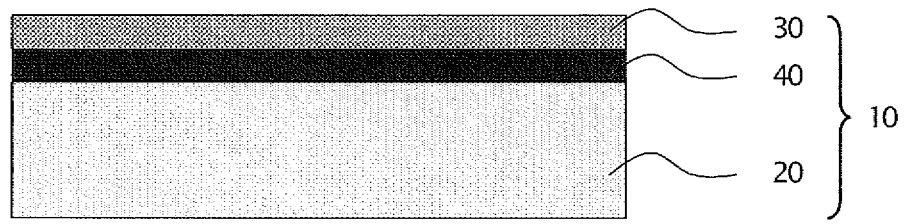
Figure 4:
FIG. 4 is a sectional view schematically showing an example of an antireflection laminate according to the present invention.
Figure 4:
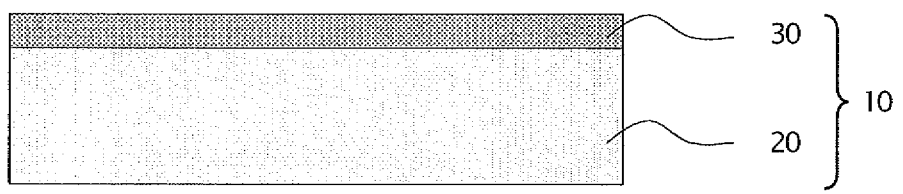
Figure 5:
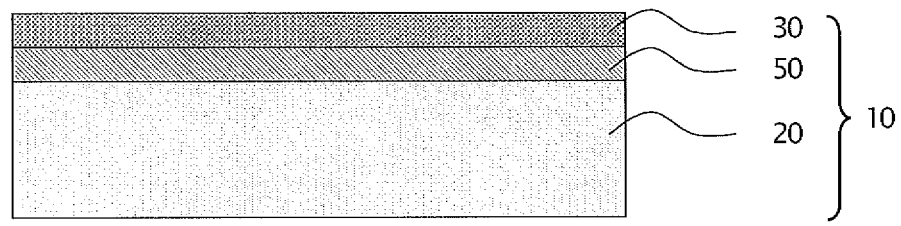
FIG. 5 is a sectional view schematically showing an example of an antireflection laminate according to the present invention.
Figure 6:
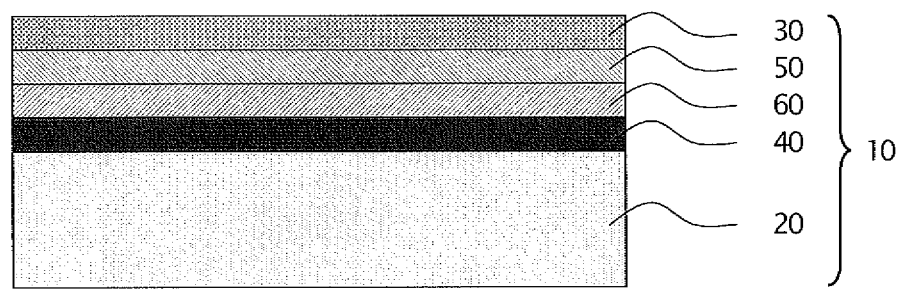
Figure 7:
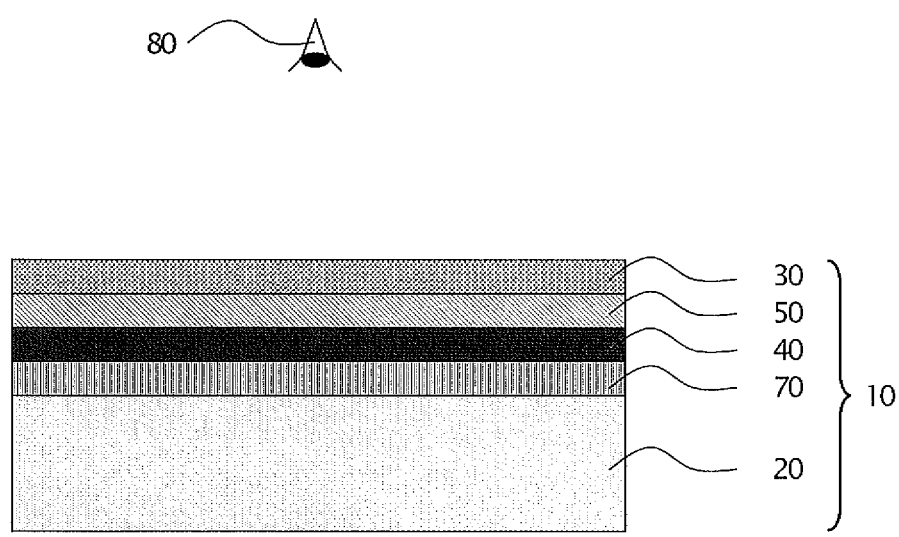

a hollow particle having an inside that is porous or hollow and is covered with an outer shell layer, and said shell layer has a surface that is modified with a crosslinkable group(s), and a solid particle having an inside that is neither porous nor hollow, and a surface that is modified with a crosslinkable group(s);

wherein the crosslinkable group(s) on the surface of the hollow particle and the crosslinkable group(s) on the surface of the solid particle comprise a silane coupling agent selected from the group consisting of: 3-methacryloxypropyltrimethoxysilane, 3-methacryloxypropyltriethoxysilane, 3-acryloxypropyltrimethoxysilane, 3-acryloxypropyltriethoxysilane, 3-methacryloxypropylmethyldimethoxysilane, 3-methacryloxyproplmethyldiethoxysilane, 2-methacryloxypropyltrimethoxysilane and 2-methacryloxypropyltriethoxysilane;

wherein the refractive index layer contains 5 to 50 parts by weight of solid particles having a surface that is modified with a crosslinkable group(s), with respect to 100 parts by weight of hollow particles having an inside that is covered with an outer shell layer which has a surface that is modified with a crosslinkable group(s); and wherein the average particle diameter A of the solid particles has the following relationship with the average particle diameter B of the hollow particles;

10 nm≤A≤40 nm;

30 nm≤B≤60 nm; and

A≤B.

2. The antireflection laminate according to claim 1, wherein the hollow particle and the solid particle are each an inorganic particle.

3. The antireflection laminate according to claim 1, wherein the hollow particle and the solid particle are each at least one selected from the group consisting of a metal oxide, a metal nitride, a metal sulfide and a metal halide.

4. The antireflection laminate according to claim 1, wherein at least part of the ionizing radiation curable resin comprises a compound having at least one or more hydrogen bond forming groups and three or more ionizing radiation curable groups in a molecule thereof.

5. The antireflection laminate according to claim 4, wherein the ionizing radiation curable groups are an acryloyl group(s) and/or a methacryloyl group(s).

6. The antireflection laminate according to claim 4, wherein the ionizing radiation curable resin, the hollow particle and the solid particle are covalently bound to each other via the ionizing radiation curable groups.

7. The antireflection laminate according to claim 1, wherein the thickness of the refractive index layer is 0.05 μm or more and 0.15 μm or less.

8. The antireflection laminate according to claim 1, wherein the refractive index of the solid particle is smaller than the refractive index of the ionizing radiation curable resin.

9. The antireflection laminate according to claim 1, wherein the refractive index layer is provided on one surface of an optically transparent substrate directly or via other layer as a low refractive index layer that is smallest in refractive index.

10. The antireflection laminate according to claim 9, wherein the other layer is a hard coat layer.

* * * * *

UNITED STATES PATENT AND TRADEMARK OFFICE
CERTIFICATE OF CORRECTION

| | | |
|---|---|---|
| PATENT NO. | : 8,617,693 B2 | Page 1 of 1 |
| APPLICATION NO. | : 12/696481 | |
| DATED | : December 31, 2013 | |
| INVENTOR(S) | : Saki Isono et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this
Twenty-first Day of July, 2015

Michelle K. Lee
*Director of the United States Patent and Trademark Office*